US011203432B2

(12) United States Patent
Tsay et al.

(10) Patent No.: US 11,203,432 B2
(45) Date of Patent: Dec. 21, 2021

(54) SMART SERVICE TROLLEY AND TROLLEY SUPPORT SYSTEM

(71) Applicant: Safran Cabin Netherlands N.V., Alkmaar (NL)

(72) Inventors: Jenny Tsay, Haarlem (NL); Sergio Luis Gómez Serrano, Haarlem (NL); Ron Verweij, Amersfoort (NL); Arne Hoffman, Amsterdam (NL)

(73) Assignee: SAFRAN CABIN NETHERLANDS N.V., Alkmaar (NL)

( * ) Notice: Subject to any disclaimer, the term of this patent is extended or adjusted under 35 U.S.C. 154(b) by 0 days.

(21) Appl. No.: 16/977,037

(22) PCT Filed: Apr. 4, 2019

(86) PCT No.: PCT/IB2019/052766
§ 371 (c)(1),
(2) Date: Aug. 31, 2020

(87) PCT Pub. No.: WO2019/193534
PCT Pub. Date: Oct. 10, 2019

(65) Prior Publication Data
US 2021/0039789 A1     Feb. 11, 2021

Related U.S. Application Data

(60) Provisional application No. 62/652,508, filed on Apr. 4, 2018.

(51) Int. Cl.
*G08B 17/00* (2006.01)
*B64D 11/00* (2006.01)
(Continued)

(52) U.S. Cl.
CPC .......... *B64D 11/0007* (2013.01); *E05B 65/52* (2013.01); *G08B 5/36* (2013.01);
(Continued)

(58) Field of Classification Search
CPC ...... B64D 11/0007; H04W 4/80; B30B 15/06; B65G 1/06
See application file for complete search history.

(56) References Cited

U.S. PATENT DOCUMENTS 6,445,976 B1     9/2002  Ostro
9,045,229 B2 *   6/2015  Roering ............... E06B 7/2318
(Continued)

FOREIGN PATENT DOCUMENTS

CN     204055854 U    12/2014
JP     2001122128 A   5/2001
(Continued)

OTHER PUBLICATIONS

International Patent Application No. PCT/IB2019/052766, Invitation to Pay Additional Search Fee(s) and Partial Search Report, dated Jul. 15, 2019.
(Continued)

*Primary Examiner* — Toan N Pham
(74) *Attorney, Agent, or Firm* — Kilpatrick Townsend & Stockton LLP

(57) ABSTRACT

A trolley support system (100) includes at least one intelligent trolley (102) designed for use onboard passenger transportation vehicles such as aircraft. The trolley (102) includes a housing (106) with an internal compartment (108) and a door (110) that provides selective access to the internal compartment. The door is movable between a closed position and an unclosed position. The trolley also includes a control sensor (116) that configured to detect at least one characteristic of the trolley and a visual indicator (122) configured to emit a visual transmission based on the at least one detected characteristic. A trolley node (104) having a controller may be included with the trolley and may be communicatively coupled to the control sensor and the visual indicator.

20 Claims, 30 Drawing Sheets

(51) Int. Cl.
*H04W 4/80* (2018.01)
*E05B 65/52* (2006.01)
*G08B 5/36* (2006.01)
*G08B 21/18* (2006.01)

(52) U.S. Cl.
CPC ............ *G08B 21/182* (2013.01); *H04W 4/80* (2018.02); *E05Y 2400/44* (2013.01); *E05Y 2400/45* (2013.01); *E05Y 2400/66* (2013.01); *E05Y 2400/822* (2013.01); *E05Y 2900/602* (2013.01)

(56) References Cited

U.S. PATENT DOCUMENTS

| | | | |
|---|---|---|---|
| 9,302,440 | B2 | 4/2016 | Doaran et al. |
| 2008/0120187 | A1* | 5/2008 | Wesley ............ B62B 3/02 705/15 |
| 2009/0121085 | A1 | 5/2009 | Hettwer |
| 2014/0137574 | A1* | 5/2014 | Hothi ............ B64D 11/0007 62/62 |
| 2016/0084592 | A1 | 3/2016 | Mackin et al. |
| 2016/0258188 | A1* | 9/2016 | Vandewall ............ E05C 1/10 |

FOREIGN PATENT DOCUMENTS

| | | |
|---|---|---|
| WO | 2004074100 | 9/2004 |
| WO | 2010144054 A1 | 12/2010 |
| WO | 2011159561 | 12/2011 |
| WO | 2015079190 A1 | 6/2015 |

OTHER PUBLICATIONS

International Patent Application No. PCT/IB2019/052766, International Search Report and Written Opinion, dated Oct. 2, 2019.

* cited by examiner

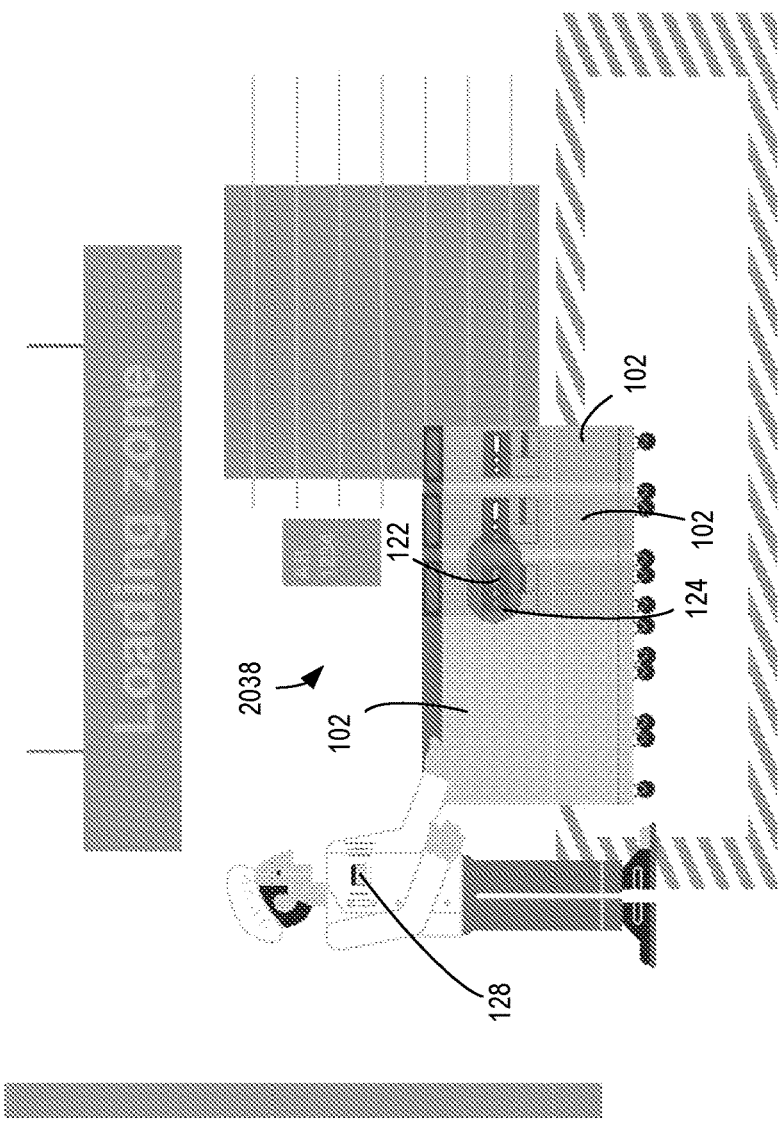
FIG. 20
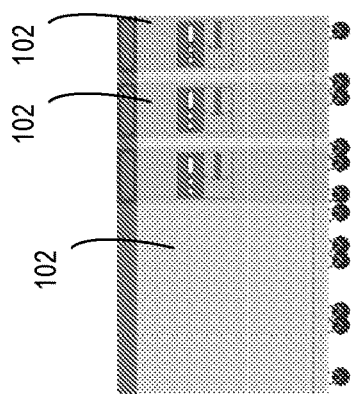

SMART SERVICE TROLLEY AND TROLLEY SUPPORT SYSTEM

REFERENCE TO RELATED APPLICATIONS

This application claims the benefit of U.S. Provisional Application No. 62/652,508, filed on Apr. 4, 2018 and titled PRODUCT AND PROCESS TO MANAGE AND OPERATE TROLLEY LOADING, TRANSPORT AND HANDOVER FROM THE CATERING FACILITY TO THE AIRCRAFT, the content of which is hereby incorporated by reference in its entirety.

FIELD OF THE INVENTION

Embodiments of this disclosure relate generally to service trolleys designed for use onboard passenger transportation vehicles such as aircraft and, more particularly, to smart service trolleys and associated trolley support systems.

BACKGROUND

Passenger transportation vehicles such as aircraft often provide beverage and meal service to passengers. Airline attendants often wheel trolleys through aircraft aisles to offer various selections. These trolleys are generally provided with an interior compartment designed to support and receive one or more trays or slidable bins. Trolleys may be provided as full-size trolleys or half-size trolleys.

A complex trolley supply chain that includes a number of stakeholders and processes is generally employed to provide a trolley that can be used to serve passengers. Common stakeholders include, but are not limited to: catering personnel that prepare the food and beverages for the trolley; delivery personnel that load and transport the trolleys from the catering facility to the transportation hub (e.g., airport) and to the particular aircraft; airport gate planner personnel that allocate gates to the aircraft (and thus delivery locations); airport security personnel; and airline personnel (e.g., flight purser, flight attendants, etc.). Common processes of the trolley supply chain include trolley preparation, delivery of trolleys (including loading, transport, and uplift), and handover of trolleys from the caterer to the airline. Due to the number of stakeholders and processes involved, the supply chain is susceptible to errors at various stages of the system that cause a ripple effect throughout the entire system and can lead to delays to various stakeholders, increased costs, and other inefficiencies.

SUMMARY

The terms "invention" and "disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various embodiments of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim According to certain embodiments of the present disclosure, a trolley includes a housing and a control sensor. The housing includes an internal compartment and a door that provides selective access to the internal compartment. The door is movable between a closed position and an unclosed position. The control sensor is configured to detect at least one characteristic of the trolley.

According to some embodiments of the present disclosure, a trolley system includes a trolley and a trolley node. The trolley includes a housing with an internal compartment and a door that provides selective access to the internal compartment. The door is movable between a closed position and an unclosed position. The trolley node includes a controller and a sealing module. The sealing module includes a door sensor configured to detect a position of the door between the closed position and the unclosed position and a locking mechanism activatable between a locked configuration and an unlocked configuration. The controller is configured to selectively activate the locking mechanism to the locked configuration based at least on the door sensor detecting the door in the closed position.

According to various embodiments of the present disclosure, a method of controlling a trolley system includes establishing, by a first trolley, a connection with a second trolley and receiving, by the first trolley, a trolley signal from the second trolley. The trolley signal includes a group identification of the second trolley. The method includes determining, by the first trolley, a signal strength of the trolley signal and comparing the determined signal strength to a predetermined signal strength threshold. The method also includes comparing, by the first trolley, the group identification of the second trolley to a group identification of the first trolley. The method further includes pairing, by the first trolley, the second trolley with the first trolley based on the determined signal strength being at least the predetermined signal strength and the group identification of the second trolley matching the group identification of the first trolley. Pairing the second trolley with the first trolley includes activating a visual indicator of the first trolley and a visual indicator of the second trolley such that both visual indicators emit a first visual transmission.

According to certain embodiments of the present disclosure, a method of controlling a trolley system includes forming a swarm of trolleys where the swarm of trolleys includes a group identification. The method includes receiving, by a first trolley of the swarm of trolleys, a handler signal from a handler device. The handler signal includes a group identification and a process start identification. The method also includes comparing, by the first trolley, the group identification of the handler signal to the group identification of the swarm of trolleys. The method may include activating a visual indicator on each trolley of the swarm of trolleys to emit a first visual transmission based on the group identification of the handler signal matching the group identification of the swarm of trolleys.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 2 illustrates components of a trolley node for the trolley of FIG. 1 according to aspects of the current disclosure.

FIG. 20 illustrates a stage of the active alert process of FIG. 19.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others are intended to refer to the orientation as illustrated and described in the figure (or figures) to which the components and directions are referencing.

Figure 1:
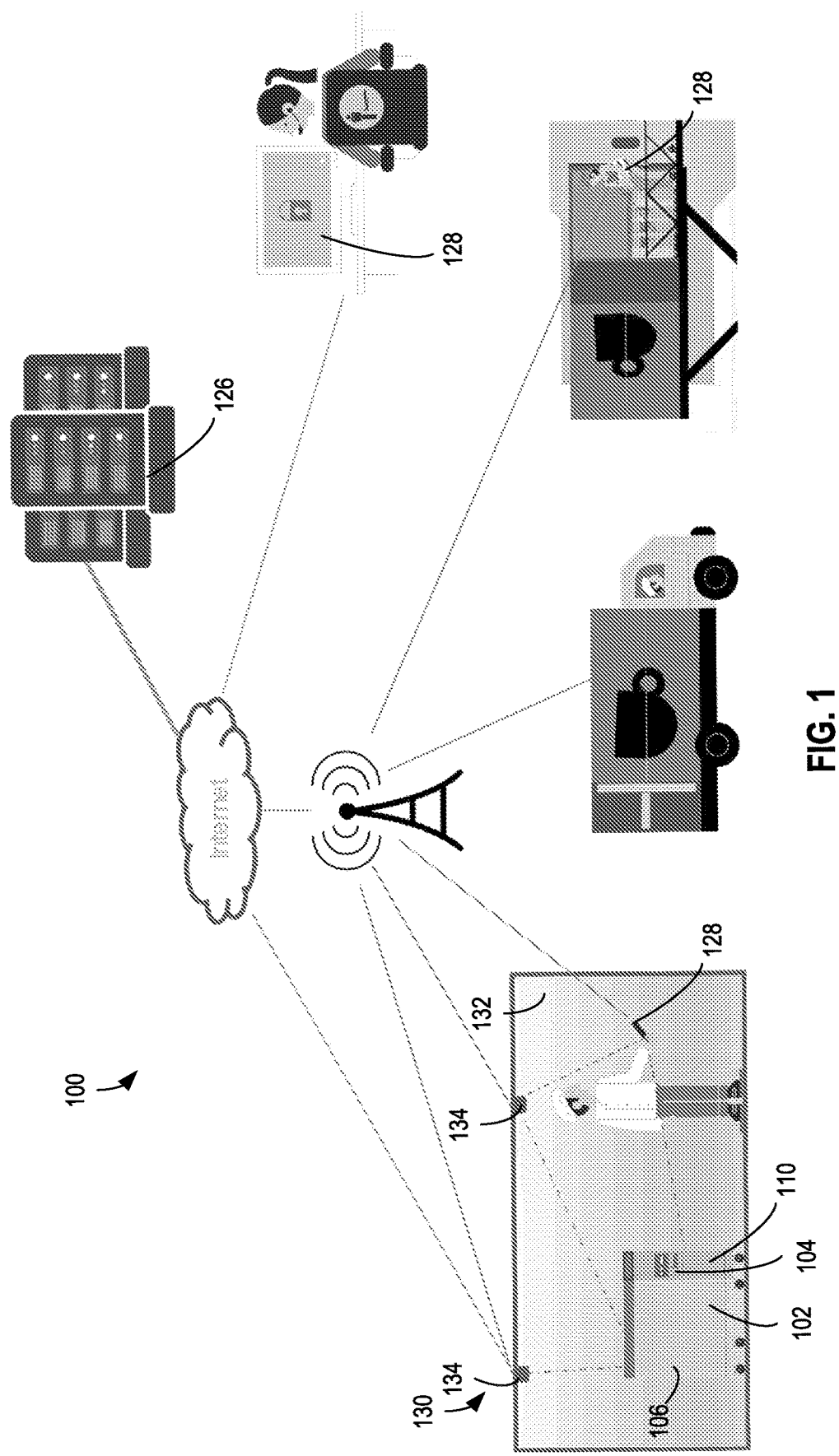
FIG. 1 illustrates a trolley support system with the trolley according to aspects of the current disclosure.
Figure 2:
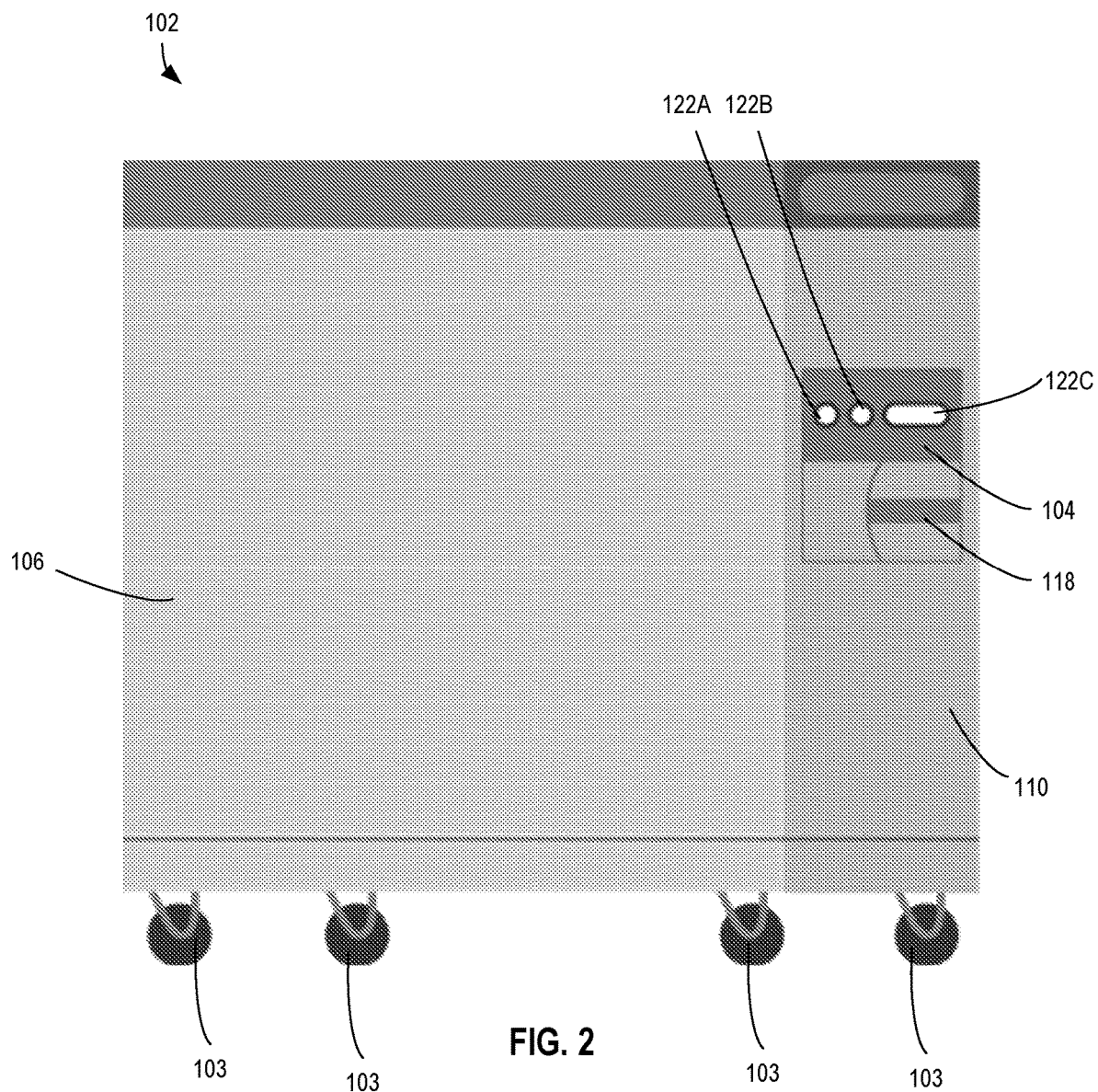
FIG. 2 illustrates the trolley of FIG. 1.

Embodiments of the present disclosure are directed to intelligent trolleys and trolley support systems that include at least one intelligent trolley. FIG. 1 illustrates an example of a trolley support system 100 that includes at least one trolley 102 having a trolley node 104.

The trolley 102 may be a container adapted for storing perishable items, a container for non-perishable items, a high security container, or any other type of container which may be loaded onto a transport vehicle galley. The trolley 102 may be movable through wheels 103 or various other suitable movement mechanisms. As best illustrated in FIGS. 2-8, the trolley 102 includes a housing 106 that includes an internal compartment 108 and a door 110 that provides access to the internal compartment 108 by moving between a closed position and an unclosed position. As illustrated in FIG. 8, trays for food or other containers may be retained within the internal compartment 108.

As background, current trolley management systems involve a number of processes, such as content loading, grouping at dispatch, loading a truck, transportation to airport, uplifting and handover processes to the airline, and trolley loading onto a particular aircraft. These processes are supported by paperwork instructions and paper loading lists, which require manual processes by each stakeholder (such as the caterer, security, and airline). The trolley supply chain is a complex infrastructure system subject to usual air travel disruptions, such as flight delays, aircraft changes, and potential personnel inefficiencies and errors. These errors cause large losses of income and time to both the caterers and the airline side of the equation. The present inventors have sought to provide a trolley support system that can accurately track trolleys. It is possible for trolleys to be tracked individually or as a trolley "swarm" (which term is used to indicate more than one trolley intended to travel together.) Trolleys are typically loaded in groups and because all trolleys look alike, it is possible for a trolley to be missed loaded with a different swarm or left behind altogether. The present disclosure provides one or more status indicators that provide a stakeholder (e.g., a caterer, security, transport personnel, aircraft attendant, or other related party) with information about the trolley status. Systems may be provided to track an individual trolley location, a trolley interior compartment temperature, the status of the trolley door (e.g., sealed or unsealed) in order to detect potential tampering, or other parameters. The information tracked and delivered to one or more stakeholders may include but is not limited to trolley location information (e.g., information about whether the trolley has traveled with its swarm), trolley temperature information (e.g., information about the temperature of the interior compartment of the trolley for safety and food regulation reasons), trolley door status information (e.g., information about whether the trolley door has been opened or otherwise unsealed during transport), or any other types of information detected by one or more sensors located on or in the vicinity of the trolley.

Additionally, the systems may also work on a larger level in order to track a trolley swarm. For example, the system may link one or more trolleys together and define the set of trolleys as a "swarm." Software may be provided that forms a mesh network with operator receiving devices and trolley nodes that track and deliver information. The identified swarm may then be loaded on an aircraft together. Tracking a swarm can ensure that an individual trolley does not get misdirected or left behind. For example, when it is time to load a swarm and a series of trolleys have been tagged to be associated with one another as a swarm (e.g., Swarm A), an operator may have a receiving device that can receive information from each of the trolleys in Swarm A. In one example, the information received is a particular colored light on each of the trolleys labeled as a member of Swarm A. As the operator approaches Swarm A, either his/her receiving device may give a visual or auditory indication that the operator is approaching the desired trolley swarm. As the operator nears the swarm, it is possible for all trolleys in the designated swarm (Swarm A) to be coded to blink with or otherwise display the same colored light. For exemplary purposes in this example, Swarm A may be designated with a green light. Trolleys in other swarms near the particular operator may be coded to blink with a differently colored light, e.g., a red light. Alternatively, different swarms may be provided with separate individual colors. For example, Swarm A may be labeled with a green light, Swarm B may be labeled with an amber light, Swarm C may be labeled with a blue light, and so forth. As the operator identifies the swarm to be loaded, Swarm A, s/he can easily do so using the information received by the receiving device and/or the information displayed by each trolley in the swarm (e.g., colored lights).

Continuing with the example, if a trolley from Swarm B is mistakenly grouped with the trolleys from Swarm A, the operator may be given a visual or auditory indication. The indication may be received by the operator's receiving device. Additionally or alternatively, the indication may be a visual or auditory indicator on the misplaced trolley from Swarm B. If the loading operator is supposed to be loading Swarm A trolleys marked green, s/he will know that any other color trolley should not be loaded with that swarm. Loading of a red or amber or blue trolley with the trolleys that should be marked green in this example may result in a visual or auditory alarm or alert. This alarm or alert may be delivered to the operator's receiving device and/or the alarm or alert may be displayed by the trolley that the operator is attempting to mistakenly load.

In general, the indicators delivered or displayed are based on the proximity of the trolleys to one another. In other examples, the indicators delivered or displayed may be based on the location of the trolleys as designated in a trolley transportation plan. For example, in the loading zone, trolleys may display a different color than once they are loaded. Any of the indicators disclosed herein may be delivered, displayed, detected and/or processed by one or more trolley nodes.

Figure 3:
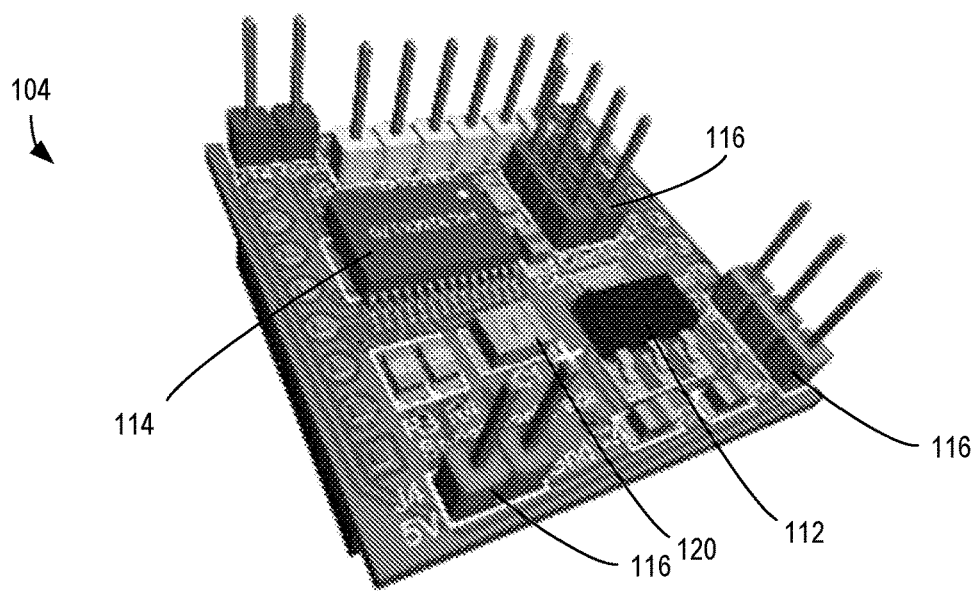
FIG. 3 illustrates the trolley of FIG. 1 with a first visual indicator activated.

The trolley node 104 may include a processor 112, a memory 114, a control sensor 116, a control mechanism 118, a communication module 120, a visual indicator 122, an identification module, and/or a power source. FIG. 3 illustrates an example of the processor 112, the memory 114, and the communication module 120 of the trolley node 104. The number of each component of the trolley node 104 should not be considered limiting on the current disclosure. The trolley node 104 may be provided integrally with the trolley 102 (e.g., it is not removable from the trolley 102) (see FIGS. 1-8) or some (or all) of the components of the trolley node 104 may be removable from the trolley 102 (see FIGS. 32-38). It will be appreciated that some or all of the components of the trolley node 104 may be included together in a single package or sensor suite, such as within the same enclosure, although they need not be in other embodiments.

The control sensor 116 is configured to detect at least one characteristic of the trolley 102. In various examples, the control sensor 116 may include, but is not limited to, a door positioning sensor (e.g., a HALL sensor or other suitable sensor) for detecting a position of the door 110, a temperature sensor for detecting a temperature within the internal compartment 108, a barometric pressure and altitude sensor, a humidity sensor for detecting a humidity within the internal compartment 108, a magnetometer, an accelerometer, a geolocation sensor (e.g., GPS), a proximity sensor, an indoor positioning sensor, or various other suitable control sensors, or any combination thereof. In certain examples, the trolley node 104 includes a plurality of control sensors 116 such that a plurality of characteristics of the trolley 102 may be detected.

The control mechanism 118 may be selectively activated or deactivated based at least in part on the characteristic detected by the control sensor 116. In various examples, a plurality of control mechanisms 118 may be provided with the trolley 102. Optionally, the control mechanism 118 is communicatively coupled with the control sensor 116. In one non-limiting example, the control sensor 116 may be a door positioning sensor and the control mechanism 118 includes a door locking mechanism that is activatable between a locked configuration and an unlocked configuration. In this example, the door locking mechanism may be selectively controlled such that the door locking mechanism is in the locked configuration based at least in part on the door positioning sensor detecting that the door 110 is in the closed position. As another non-limiting example, the control sensor 116 may be a temperature sensor and the control mechanism 118 is a heating and cooling device that is activatable between a heating configuration and a cooling configuration. In this example, the heating and cooling device may be selectively controlled such that the heating and cooling device heats or cools the internal compartment 108 based on the temperate detected by the temperature sensor. Various other suitable control mechanisms 118 may be utilized with various control sensors 116 as desired.

The communication module 120 may be a wired or wireless system that allows for communication with other devices of the trolley support system 100, such as other trolleys and/or a handler device. The communication module 120 may include at least one of a transmitter, a receiver, or a transceiver. In some embodiments, the communication module 120 connects wirelessly to another device via radio, LAN, Bluetooth®, network, Wi-Fi, and/or other suitable connections. In one non-limiting example, the communication module 120 is a Bluetooth® beacon with an antenna such that the communication module 120 provides for Bluetooth® communication. The communication module 120 may also be a port, jack or other plug for inserting a cable to connect to another device.

The visual indicator 122 may be activated to emit a visual transmission. While the visual indicator 122 is illustrated, in other examples, various other suitable types of indicators may be utilized in place of or in combination with the visual indicator 122 to give various types of reporting, alerts, alarms, notifications, etc. For example, in some cases, the trolley node 104 may include a speaker (or other suitable device) that may be activated to emit an auditory indication, and at least one characteristic of the auditory indication (e.g., pitch, frequency, volume, pattern, etc.) may be controlled by controlling the speaker. As another non-limiting example, a display or monitor may be provided to provide a different type of visual indication.

Figure 4:
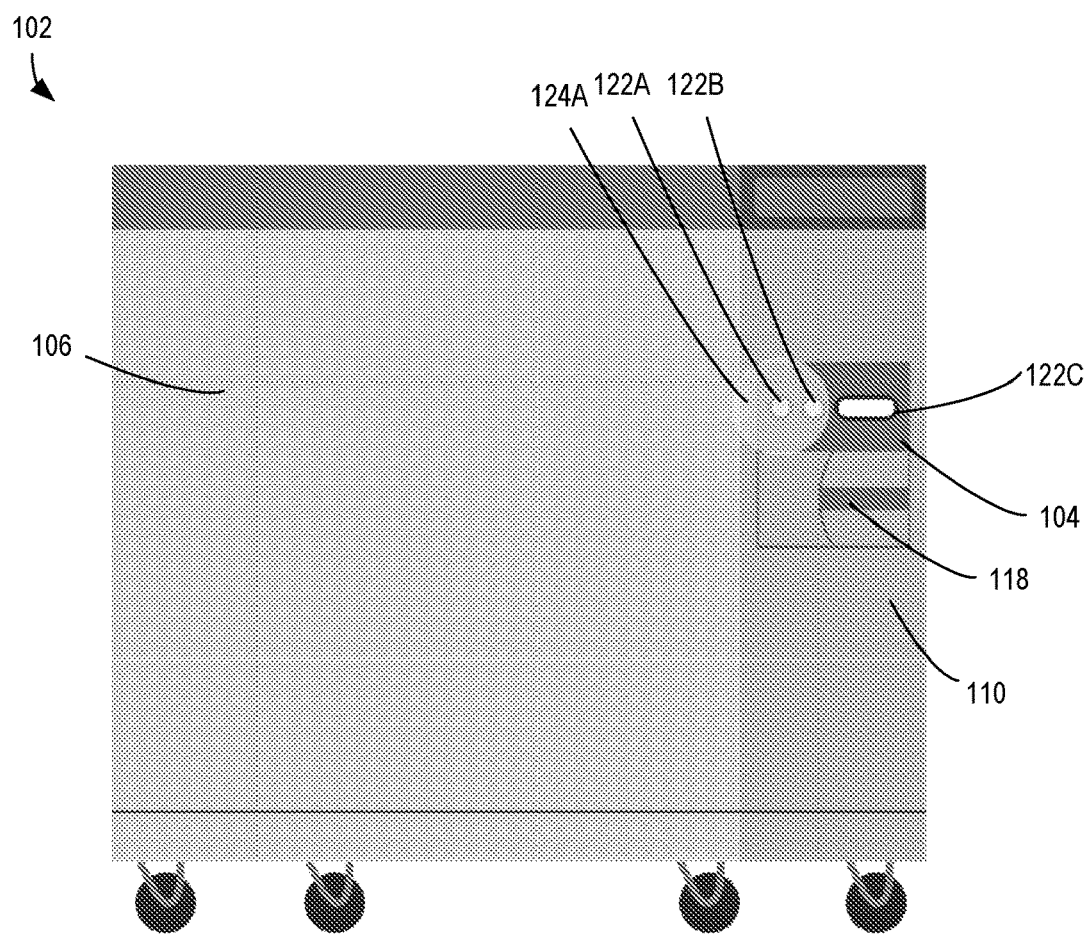
FIG. 4 illustrates the trolley of FIG. 1 with a second visual indicator activated.
Figure 5:
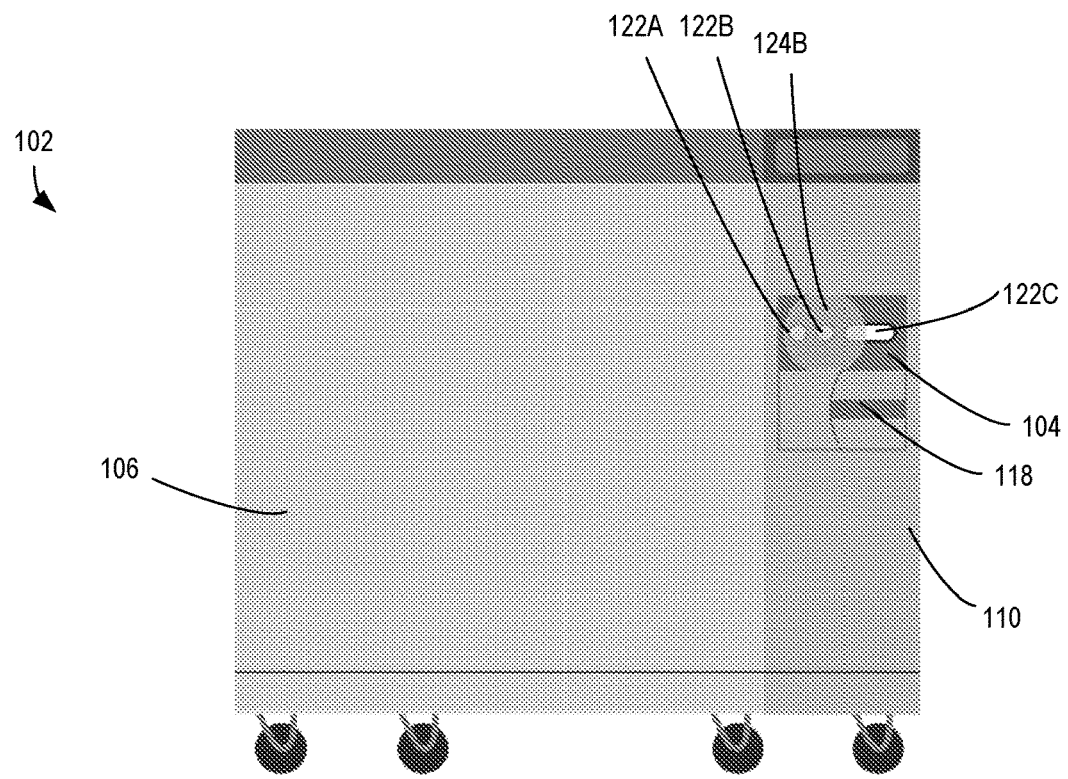
FIG. 5 illustrates the trolley of FIG. 1 with a third visual indicator activated.
Figure 6:
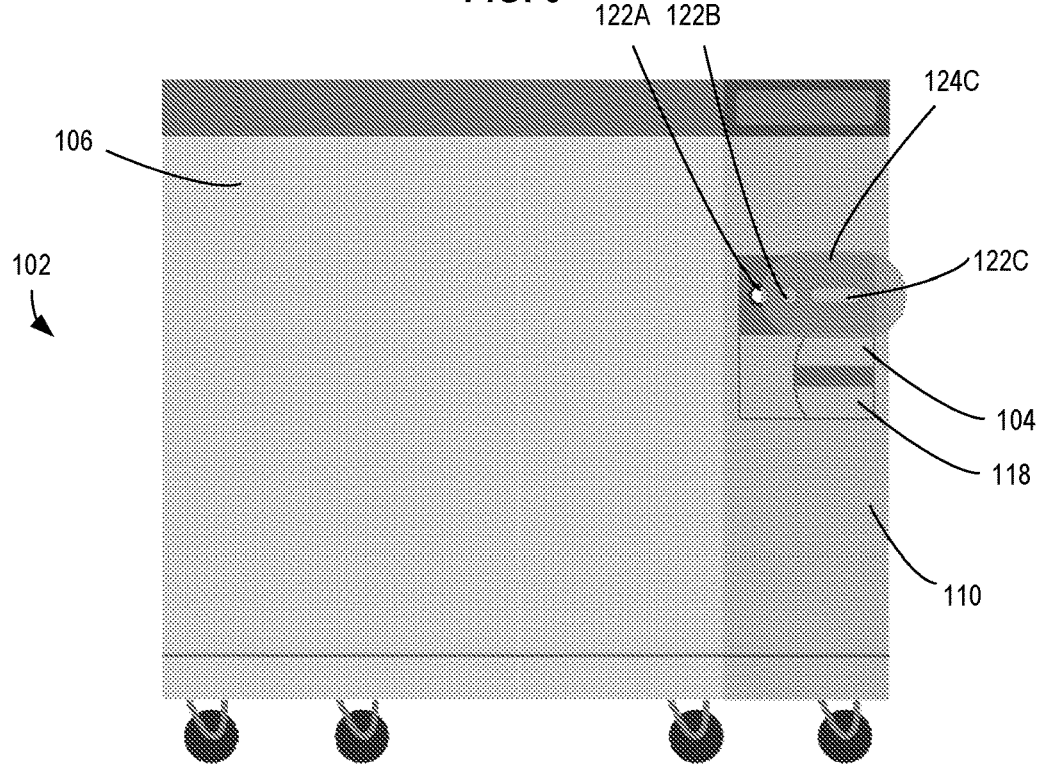

In some examples, the visual indicator 122 is a light emitting diode (LED), although in other examples, other suitable visual indicators may be utilized. In various cases, at least one characteristic of the visual transmission may be controlled by controlling the visual indictor 122. The at least one characteristic of the visual transmission may include, but is not limited to, a pattern of the visual transmission, a color of the visual transmission, a brightness of the visual transmission, combinations thereof, and/or various other characteristics of the visual transmission as desired. In some embodiments, and as illustrated in FIGS. 1-8, the trolley node 104 includes a plurality of visual indicators 122A-C. As described in detail below, the visual indicators 122A-C may be activated individually or in various combinations as desired. FIG. 4 illustrates the visual indicator 122A activated and emitting a visual transmission 124A with a first characteristic, FIG. 5 illustrates the visual indicator 122B activated and emitting a visual transmission 124B with a second characteristic, and FIG. 6 illustrates the visual indicator 122C activated and emitting a visual transmission 124C with a third characteristic. In some cases, at least one characteristic of the visual transmission of one visual indicator may be different from a corresponding characteristic of the visual transmission of another visual indicator, although it need not.

The power source may include, but is not limited to, a rechargeable battery, such that the trolley 102 is self-supporting and does not have to rely on the power of the passenger vehicle.

The processor 112 may be a general purpose processing unit or a processor specially designed for trolley applications or a processor specially designed for wireless communications (such as a Programmable System On Chip (PSOC) from Cypress Semiconductor or other suitable processors). The memory 114 may include a long-term storage memory and a short-term working memory. The memory 114 may be used by the processor 112 to store a working set of processor instructions. The processor 112 may write data to the memory 114. The memory 114 may optionally include one or more instruction modules that may provide instructions for the processor to perform various functions related to the trolley 102, as described in detail below. As used herein, instructions refer to computer-implemented steps for processing information in the system. Instructions may be implemented in software, firmware or hardware and include any type of programmed step undertaken by components of the system. The memory 114 may also store data from the various components of the trolley node 104.

The identification module may include a swarm or group identification and optionally other trolley identification data. The identification module may be stored in the memory 114 or various other suitable locations. Other trolley identification data may include the contents of the trolley 102, a repair status of the trolley 102, the location of the trolley, the load or unload status of the trolley, and/or various other trolley identification data as desired. In some cases, the group identification is included in communications from the trolley node 104 (e.g., via the communication module).

Referring back to FIG. 1, in addition to the trolley 102, the trolley support system 100 may include a server 126 and at least one handler device 128. The server 126 includes a processor and a memory connected to the processor. A computer program with one or more processes or sets of instructions as described below may be loaded onto the memory unit. In some cases, the trolley 102 may directly communicate with the server 126; however, in other examples, the trolley 102 may indirectly communicate with the server 126 (e.g., via an intermediate connection to a handler device 128 or other communication node).

The handler device 128 may be a portable device such as a smartphone or tablet, although it need not be portable in other examples. In various examples, a handler device 128 is associated with each stakeholder of the trolley supply chain. The handler device 128 may be a part of the trolley support system 100 and/or may also be a portable device owned by the stakeholder or stakeholder personnel that can be connected to the server 126 via a computer program, such as a dedicated application, or via a wireless local area network and/or an internet connection.

Figure 7:
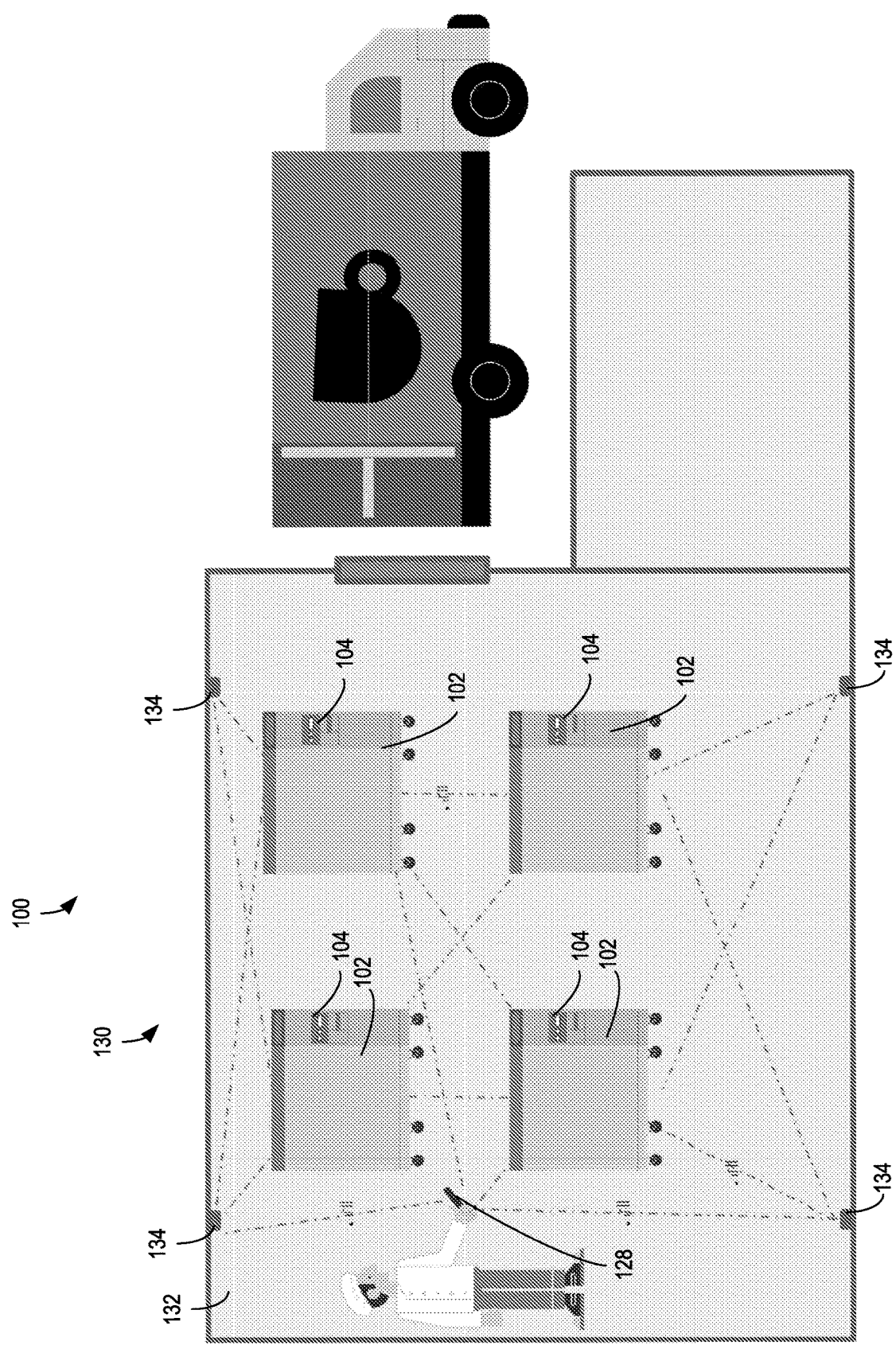
FIG. 7 illustrates a portion of the trolley support system of FIG. 1.
Figure 8:
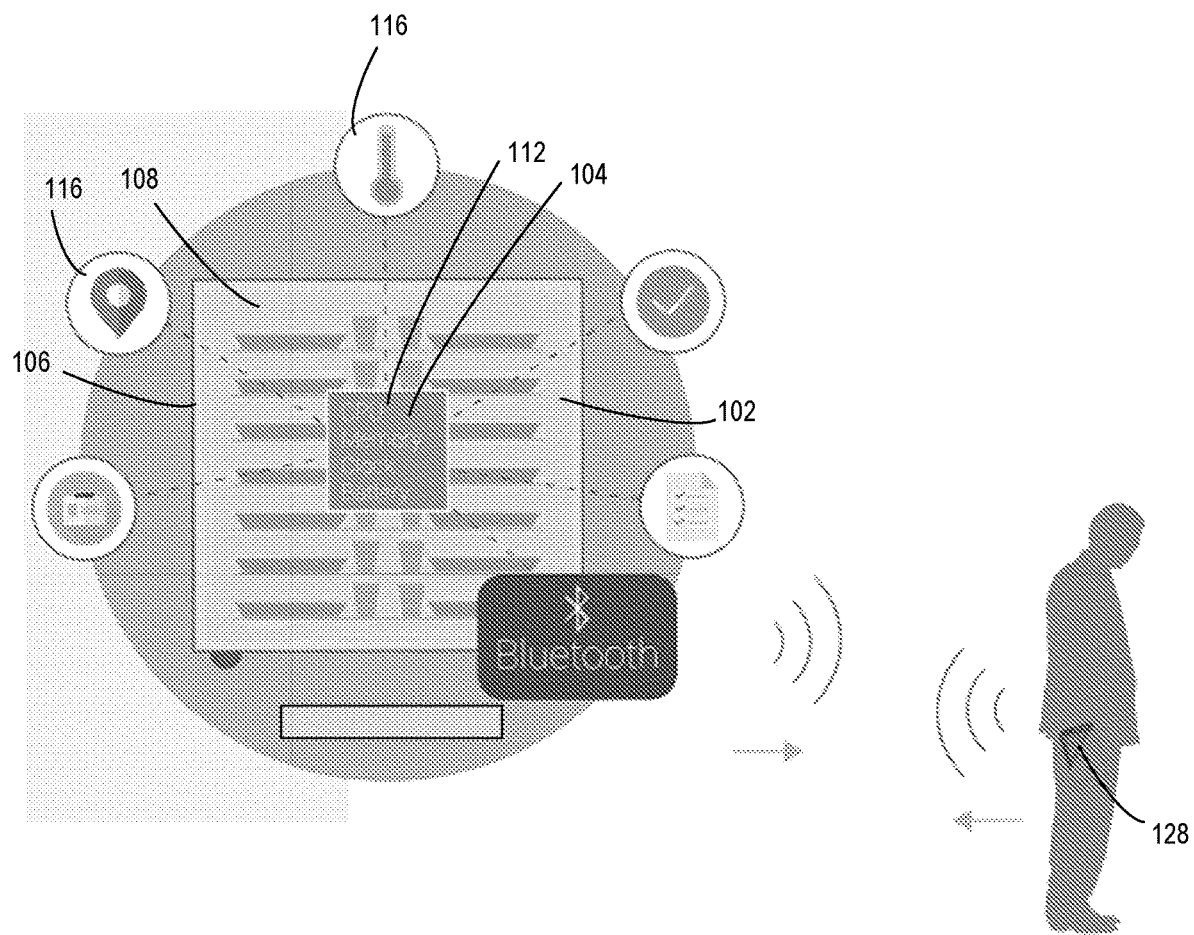
FIG. 8 illustrates an example of a trolley and a handler device of a trolley support system according to aspects of the current disclosure.

Referring to FIGS. 1 and 7, the trolley support system 100 may also include an indoor positioning system 130 in at least one location of the trolley supply chain. In the example of FIGS. 1 and 7, the indoor positioning system 130 is provided in a catering facility 132. The indoor positioning system 130 may be used to wirelessly locate objects or people inside a structure via dead reckoning, Wi-Fi based positioning, Bluetooth, Received Signal Strength Indication, or other suitable technology. The indoor positioning system 130 may actively locate people or objects within the area or may provide ambient location or environmental context for devices to get sensed. Optionally, the indoor positioning system 130 includes indoor beacons 134 to detect trolleys and facilitate sensing of trolleys within the catering facility 132. The indoor beacons 134 may be at fixed or predefined locations such that the indoor positioning system 130 is provided for a predefined area. The indoor beacons 134 may be communicatively coupled to the server 126. In other examples, the indoor beacons 134 may be omitted, and the indoor positioning system 130 is provided via the Bluetooth or other suitable wireless systems of the trolleys 102.

The trolley support system 100 allows for trolleys to be self-monitoring and self-guiding, thereby increasing the speed and efficiency of the various processes of the trolley supply chain without requiring actor input. In addition, the trolley support system 100 allows for self-processing of the trolleys such that notifications and/or requests may be sent to particular handler devices as attention is required. For example, if the temperature of a trolley has changed beyond specified thresholds (which may be set by one or more food regulation authorities), the trolley may self-report. If a trolley door has been unsealed at a time in which tampering or opening of the door should not occur, the trolley may self-report. If a trolley has become separated from its swarm or is otherwise in an undesignated location according to its travel plan, the trolley may self-report. If a trolley swarm has been delivered to a location that is not its designated location, the trolley swarm may self-report. The self-reporting may be sending an auto message to one or more operators or stakeholders charged with managing the trolley or the trolley swarm. The self-reporting may be creating a "trolley incident report" that is associated with the trolley node. The self-reporting may be a visual light or an auditory warning or alert sound. Other types of self-reporting are possible and considered within the scope of this disclosure.

Figure 9:
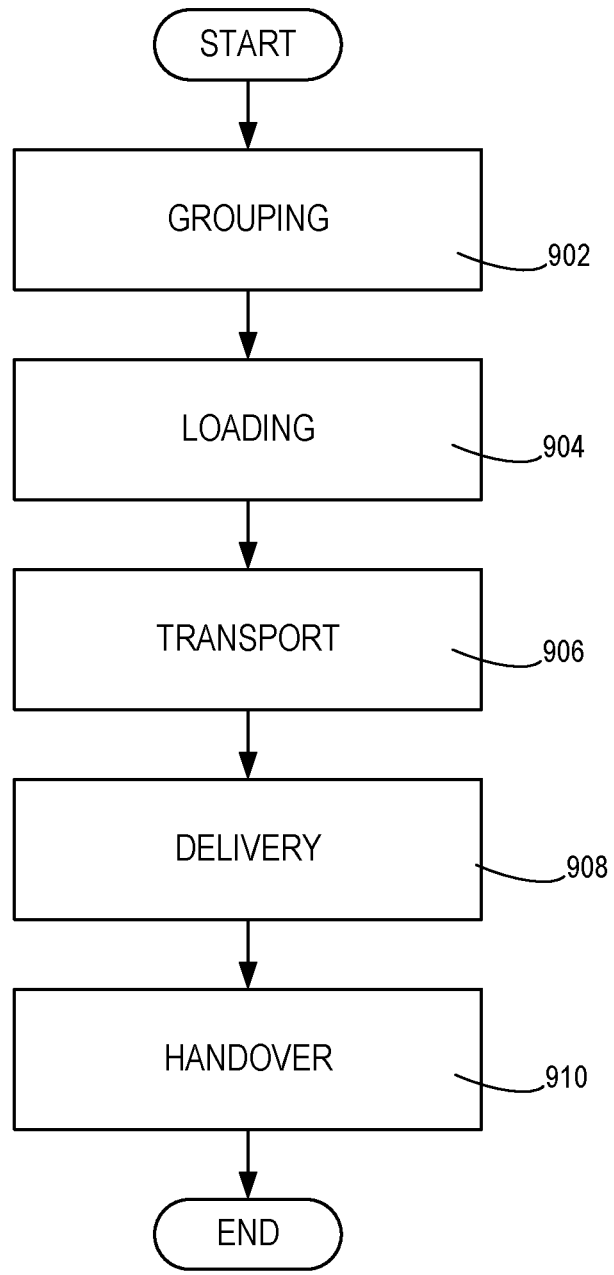
FIG. 9 illustrates a flow chart of handling processes of the trolley of FIG. 1 according to aspects of the current disclosure.

FIG. 9 is a flowchart of various processes of the trolley supply chain 900 that can be performed by the trolley support system 100. As illustrated in FIG. 9, the trolley supply chain may include a grouping process 902, a loading process 904, a transport process 906, a delivery process 908, and a handover process 910. These processes are described in greater detail below in FIGS. 10-39. In some cases, the various processes and/or sub-processes may be implemented by the server 126, the trolley node 104, or combinations thereof.

The various illustrative logical blocks, modules, and method steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Artisans may implement the described functionality in varying ways for each particular application, but such implementation decisions should not be interpreted as causing a departure from the scope of the present disclosure.

Figure 10:
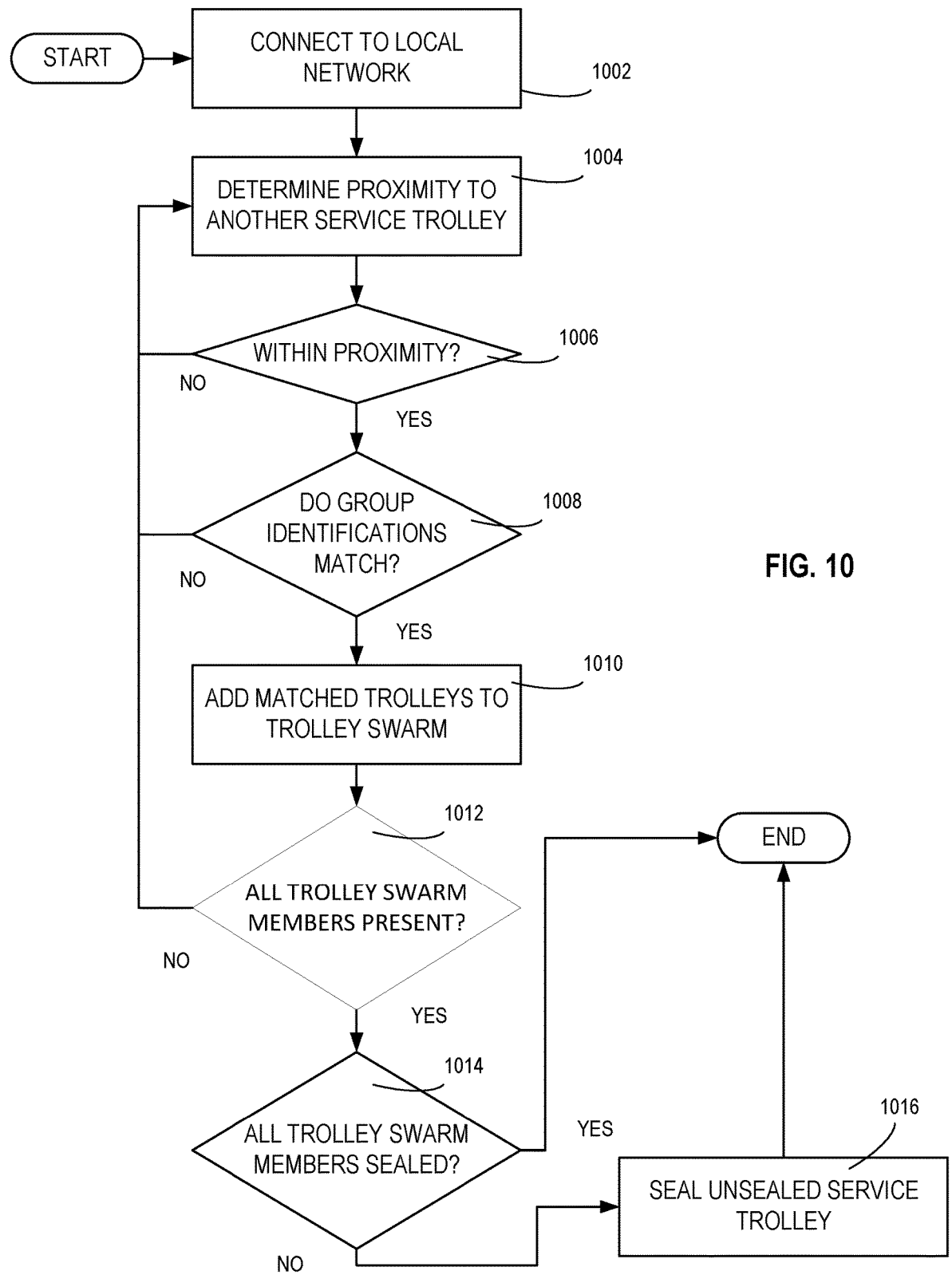
FIG. 10 is a flow chart of a grouping process with the trolley of FIG. 1 according to aspects of the current disclosure.
Figure 39:
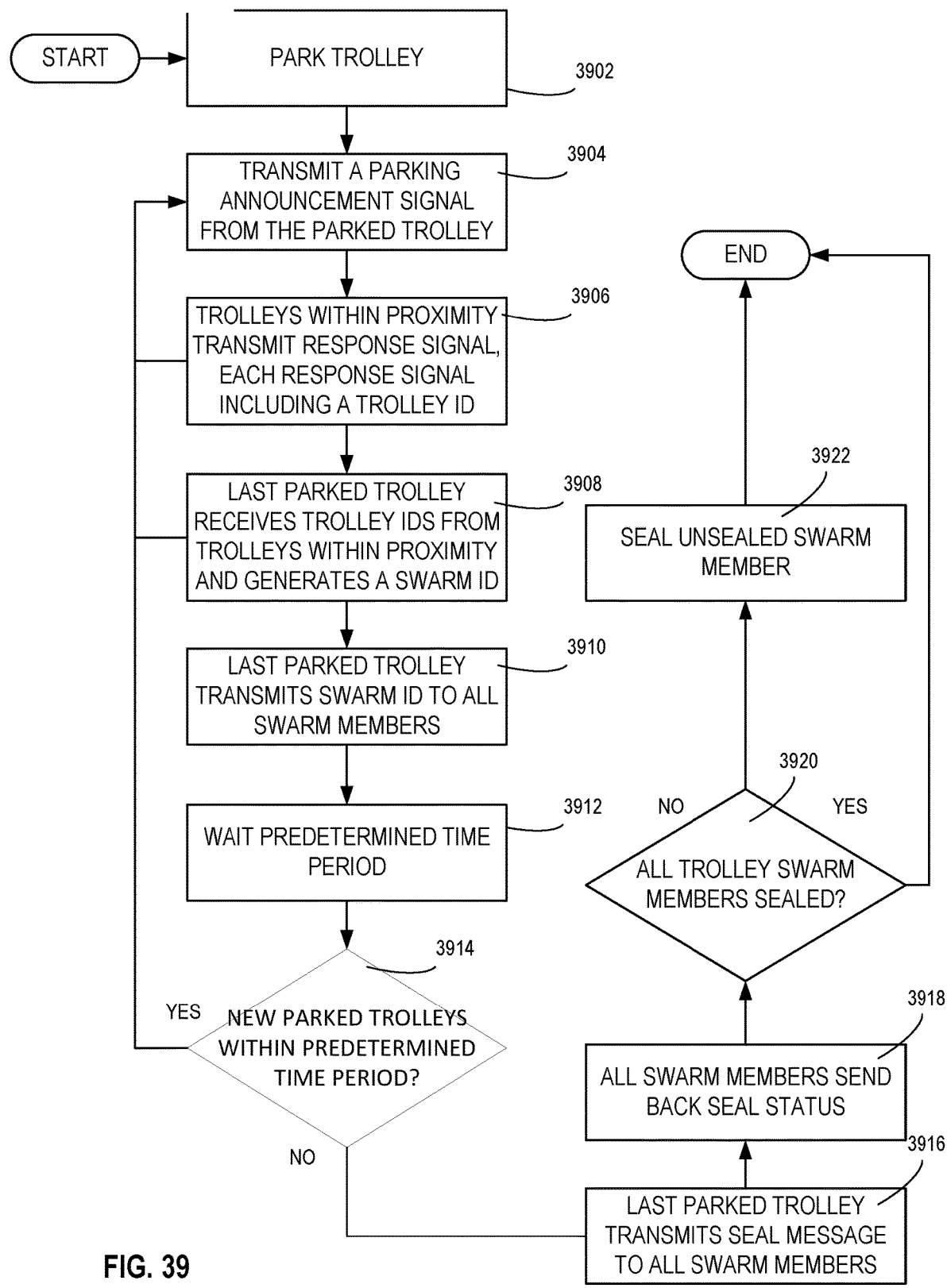
FIG. 39 is a flow chart of another grouping process with the trolley of FIG. 1 according to aspects of the current disclosure.

FIG. 10 illustrates an example of the grouping process 902 for the trolley support system 100. FIG. 39 illustrates another example of the grouping process 902 for the trolley support system 100.

In a block 1002, a first trolley is connected to a local network. In some examples, connecting to the local network includes connecting to an indoor positioning system of a predefined area via Bluetooth or other wireless technology. Connecting to the indoor positioning system optionally includes connecting to an indoor beacon via Bluetooth or other suitable wireless technology (e.g., sending a Bluetooth or wireless signal to connect to the system). In various examples, connecting the local network includes forming a grid network with at least a second trolley via Bluetooth or another suitable wireless technology. In various aspects, connecting to the location network includes establishing wireless communication between at least two trolleys in a predetermined area. In some cases, block 1002 includes determining a position of the first trolley within a predefined area. The predefined area may be a catering facility or other predefined area as desired. In some cases, the position of the first trolley is determined based on a signal strength of a locating signal from the first trolley to one or more nodes of the indoor positioning system, which may include the indoor beacons, other trolleys, and/or handler devices.

In a block 1004, the first trolley determines a proximity to the second trolley.

Determining the proximity of the second trolley to the first trolley includes receiving a trolley signal from the second trolley and determining a strength of the trolley signal from the second trolley to the first trolley.

In a block 1006, the process includes determining whether the second trolley is within a grouping proximity relative to the first trolley by comparing the detected signal strength of the trolley signal to a predetermined signal strength threshold. If the detected signal strength is less than the predetermined signal strength threshold, the second trolley is not proximate to the first trolley, and the process returns to block 1004. If the detected signal strength is at least the predetermined signal strength threshold, the second trolley is proximate to the first trolley.

In a block 1008, the process includes determining whether a group identification of the second trolley matches the group identification of the first trolley. The group identification of the second trolley may be included in the trolley signal from the second trolley, and the group identification of the first trolley may be included in the identification module of the first trolley.

If the group identifications do not match, the process returns to block 1004. Optionally, if the group identifications do not match, the process includes activating the visual indicator of the first trolley to emit a visual transmission having the first characteristic and activating the visual indicator of the second trolley to emit a visual transmission having a second characteristic that is different from the first characteristic.

In a block 1010, the second trolley is added to a trolley swarm that includes the first trolley based on the second trolley being proximate to the first trolley and the group identifications matching. In some examples, adding the second trolley to the trolley swarm includes activating the visual indicators on the first trolley and the second trolley such that both visual indicators emit a visual transmission having a first characteristic (e.g., color, pattern, brightness, etc.). In some cases, the trolley node of the first trolley causes both visual indicators to be activated. In various cases, adding the second trolley to the trolley swarm includes sending a notification to the server and/or at least one handler device.

In a block 1012, the process includes determining whether all trolleys of the trolley swarm that includes the first trolley are present. In various examples, this may include determining the current number of trolleys in the trolley swarm to an expected number of trolleys in the trolley swarm. If the current number of trolleys is less than the expected number of trolleys, the process returns to block 1004 to search for additional trolleys.

In a block 1014, the process determines whether each trolley of the trolley swarm is sealed. In various aspects, determining whether each trolley is sealed includes determining whether the door sensor detects the door in the closed position or the unclosed position. If the door sensor of each trolley detects the closed position, the process ends. If the door sensor of at least one sensor detects the unclosed position, the process proceeds to block 1016.

In block 1016, the process includes activating the visual indicator of the trolley with the door sensor in the unclosed position such that the visual indicator emits a visual transmission having a second characteristic different from the first characteristic. In some examples, the process includes sealing the trolley with the door sensor in the unclosed position by activating the door locking mechanism of the trolley to the locked configuration. In some cases, block 1016 includes transmitting a notification to a handler device. The notification may include an indication of the trolley swarm members that are unsealed and/or an alert to seal all trolley swarm members.

Referring to FIG. 39, in a block 3902, a trolley is parked. In some cases, the trolley is parked in a predetermined area, such as in a loading area of a catering facility, a preparation area, an unloading area, etc.

In a block 3904, the parked trolley transmits a parking signal. In various examples, the trolley node of the parked trolley transmits the parking signal. In certain examples, the parking signal is transmitted via wireless technology such as Bluetooth or other suitable wireless technology. In various aspects, the parking signal is transmitted with a predetermined signal strength such that the parking signal is transmitted within a predefined area relative to the parked trolley.

In a block 3906, other trolleys within proximity to the parked trolley (e.g., other trolleys that have received the parking signal) transmit a response signal to the parked trolley. In certain examples, the response signal from each trolley includes a trolley identification associated with that trolley. In various aspects, the response signals are transmitted via wireless technology such as Bluetooth or other suitable wireless technology.

In a block 3908, the parked trolley receives the trolley identifications from the other trolleys within proximity and generates a trolley swarm identification based on the trolley identifications. By generating the trolley swarm identification, the trolleys with the trolley identifications that were used to generate the swarm identification become grouped and associated with each other. In some cases, generating the trolley swarm identification may include excluding at least one trolley identification (i.e., the trolley with the excluded identification is not included in the trolley swarm). In certain aspects, the at least one trolley identification may be excluded based on various data included with the trolley identification including, but not limited to, the type of trolley, the intended trolley recipient, contents of the trolley, a repair status of the trolley, combinations there, or various other suitable information.

In a block 3910, the parked trolley transmits the trolley swarm identification to all trolleys of the trolley swarm. In other words, the parked trolley transmits the trolley swarm identification to all trolleys having the trolley identifications that were used to generate the trolley swarm identification. Optionally, transmitting the trolley swarm identification to all trolleys of the trolley swarm includes activating the visual indicators of the trolleys of the trolley swarm to emit a visual transmission.

In a block 3912, the process includes waiting for a predetermined time period. The predetermined time period may be controlled to be seconds, minutes, hours, etc. as desired.

In a block 3914, the process determines whether additional trolleys were parked within proximity to the trolley swarm and within the predetermined time period. Determining whether additional trolleys were parked may include determining whether another parking signal was received within the predetermined time period. If another parking signal was received within the predetermined time period, the process returns to block 3902.

In a block 3916, if no additional parking signals were received within the predetermined time period, the last parked trolley transmits a seal message to all trolley swarm members.

In a block 3918, in response to the seal message, each trolley swarm member transmits a seal status signal that includes a door sensor status to the last parked trolley. The door sensor status may include an indication that the door of the particular trolley is in the closed position or the unclosed position.

In a block 3920, the process determines whether each trolley of the trolley swarm is sealed. In various aspects, determining whether each trolley is sealed includes determining whether the door sensor detects the door in the closed position or the unclosed position. If the door sensor of each trolley detects the closed position, the process ends. If the door sensor of at least one sensor detects the unclosed position, the process proceeds to block 3922.

In block 3922, the process includes transmitting a notification to a handler device. The notification may include an indication of the trolley swarm members that are unsealed and/or an alert to seal all trolley swarm members. Block 3922 may include sealing the unsealed trolley swarm members. In some cases, the unsealed trolley swarm members are sealed by an operator of the handler device. In other examples, the unsealed trolley swarm members are automatically sealed.

Figure 11:
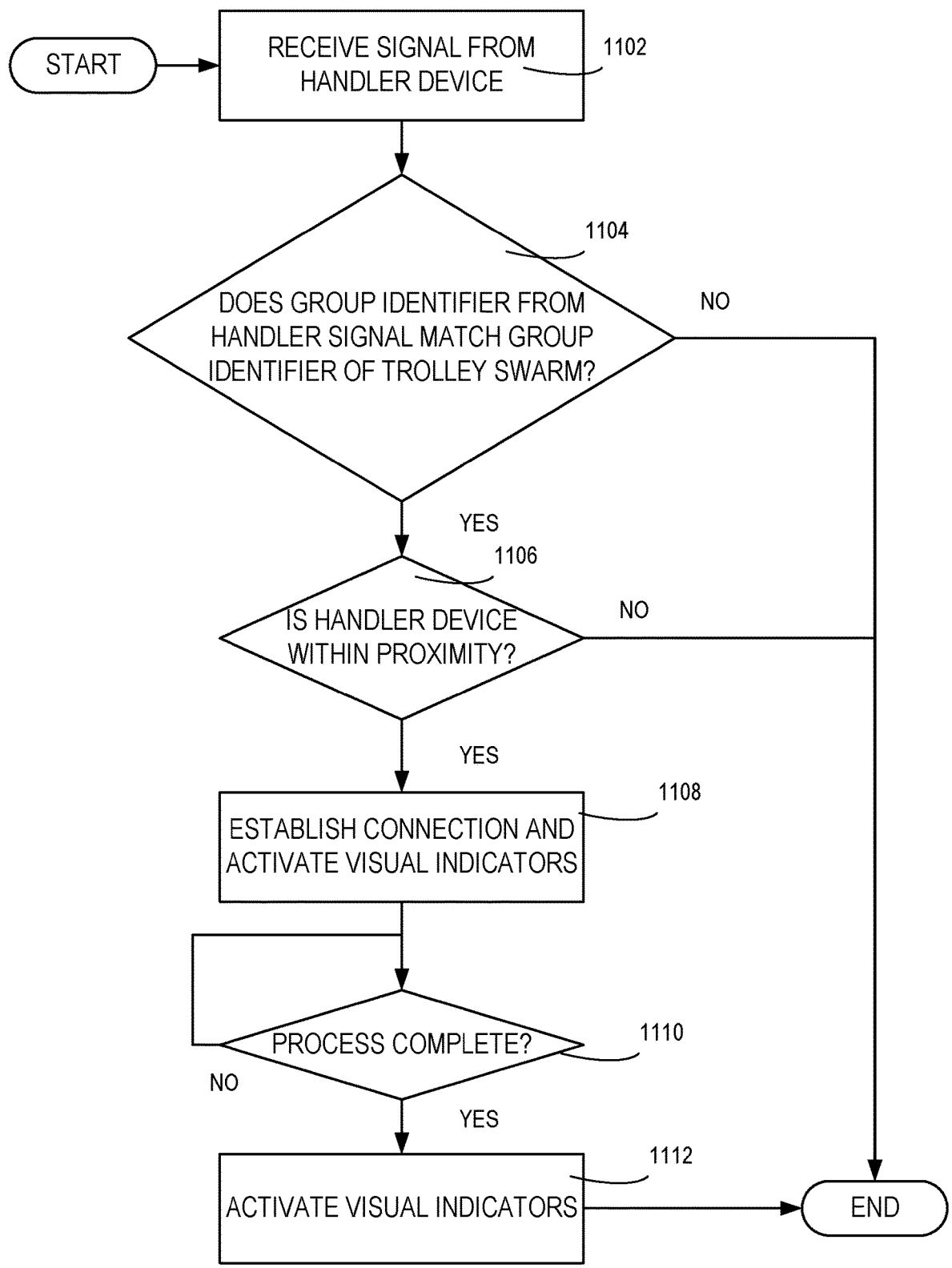
FIG. 11 is a flow chart of a handler process with the trolley of FIG. 1 according to aspects of the current disclosure.

FIG. 11 illustrates an example of a handler process with the trolley support system 100. In some examples, the handler process may generally be used as the loading process 904, the transport process 906, the delivery process 908, and/or the handover process 910.

In a block 1102, the process includes receiving a handler signal from a handler device by at least one trolley of a swarm of trolleys. In some cases, block 1102 includes receiving the handler signal by a plurality of trolleys of the swarm of trolleys. The handler signal includes a group identification. Optionally, the handler signal includes a process start identification associated with a particular process of the trolley supply chain. The process start identification may associate the handler device with a particular process of the trolley supply chain.

In a block 1104, the process includes determining whether the group identification of the handler signal matches a group identification of the swarm of trolleys. The group identification of the swarm of trolleys may be included in one or more of the trolleys of the swarm of trolleys. If the group identifications do not match, the process ends.

In a block 1106, the process determines whether the handler device is within a grouping proximity relative to at least one trolley of the swarm of trolleys. In some cases, block 1106 may be similar to block 1006 and includes determining a signal strength of the handler signal and comparing the detected signal strength of the handler signal to the predetermined signal strength threshold. If the detected signal strength of the handler signal is less than the predetermined signal strength threshold, the handler devices is not proximate to the trolley swarm, and the process ends.

If the detected signal strength of the handler signal is at least the predetermined signal strength threshold, the handler device is proximate to the trolley swarm, and in a block

1108, the process includes establishing a connection between the trolleys of the trolley swarm and the handler device. In some examples, establishing the connection includes activating the visual indicator of each trolley of the trolley swarm such that each indicator emits a visual transmission having a first characteristic. In various examples, the characteristic may be a colored light, a blinking light, a particular shape (e.g., an X or a checkmark or an "ok" sign) or any other indicator that cues the operator about trolley status. In some cases, the first characteristic from block 1108 may be the same as the first characteristic as block 1010, although it need not be. In some cases, the trolley node of one trolley causes all of the visual indicators to be activated. In various cases, connecting the handler device with the trolley swarm includes sending a notification to the server and/or at least one handler device, which may or may not be the same handler device connected with the trolley swarm. In some cases, establishing the connection starts an internal timer that may be included with the server, a trolley, and/or the handler device.

Although visual indicators are discussed herein, it should be understood that other indicators are possible and considered within the scope of this disclosure. For example, it is possible for an auditory signal such as an alert or alarm to be transmitted as well. It is also possible for the wheels of the trolley to be automatically locked if a trolley from a particular swarm is attempted to be combined with an unrelated swarm without appropriate designation changes.

In a block 1110, the process determines whether the process is completed. Determining whether the process is complete may include comparing the internal timer to an expected, predetermined process duration based on the process start identification. Determining whether the process is complete may include determining whether a second handler signal is received by at least one trolley of the trolley swarm that includes a process end identification.

In a block 1112, if the process associated with the handler device is completed, the method includes activating the visual indicator of each trolley of the trolley swarm such that each indicator emits a visual transmission having a second characteristic. In some cases, the trolley node of one trolley causes all of the visual indicators to be activated. In various cases, block 1112 includes sending a notification to the server and/or at least one handler device, which may or may not be the same handler device connected with the trolley swarm. In some cases, block 1112 includes stopping the internal timer, determining a process duration based on the time period from the starting of the internal timer in block 1108 to the stopping of the internal timer, and saving the process duration to at least one trolley and/or the server.

Figure 12:
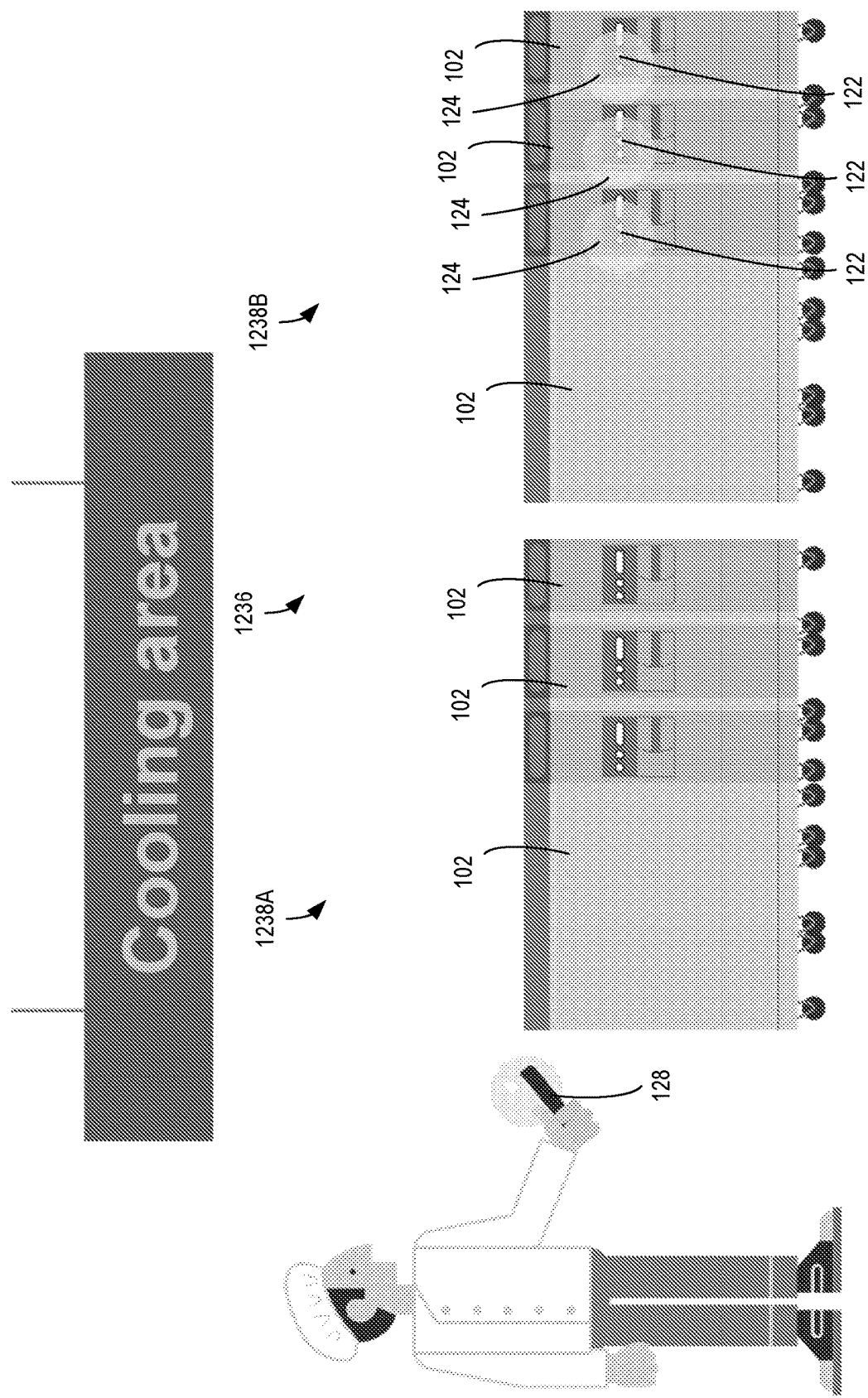
FIG. 12 illustrates a stage of a handler loading process according to aspects of the current disclosure.
Figure 13:
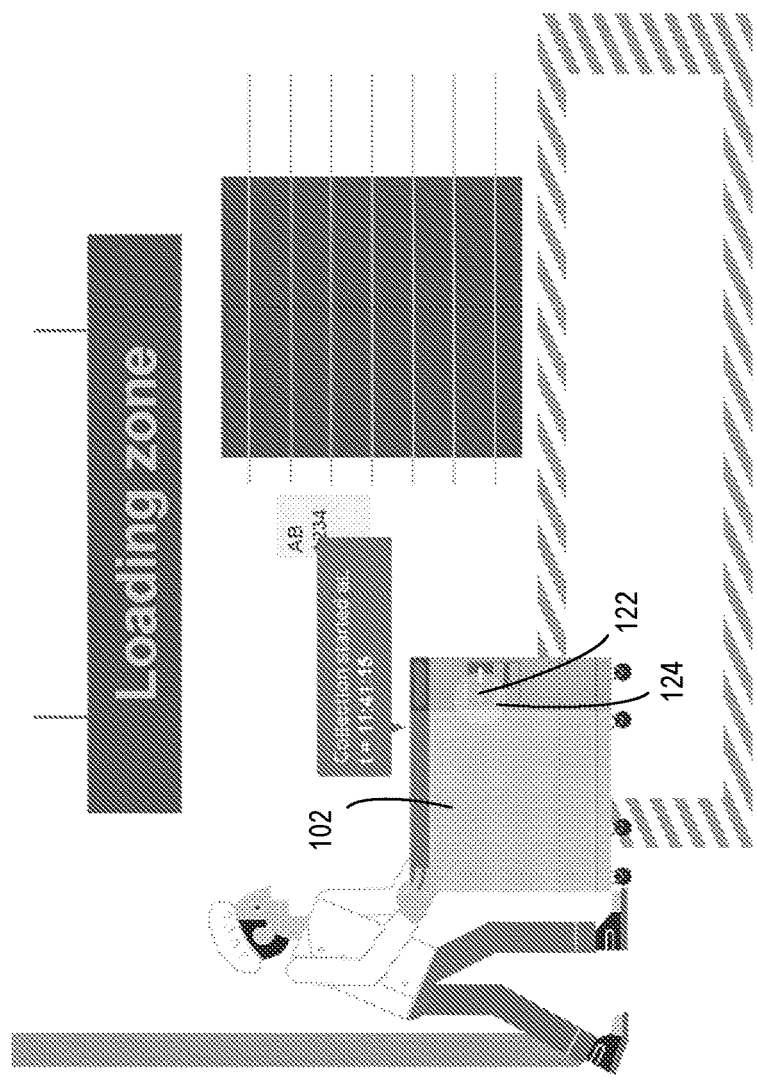
FIG. 13 illustrates another stage of the handler loading process of FIG. 12.
Figure 13:
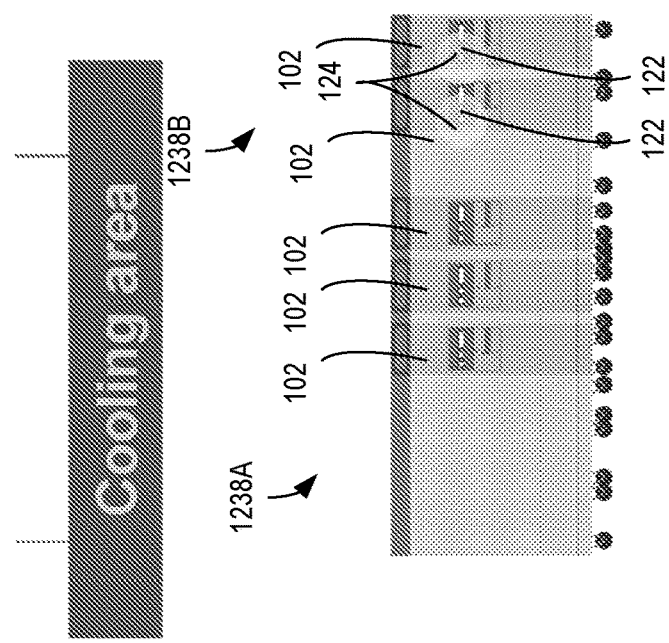
Figure 14:
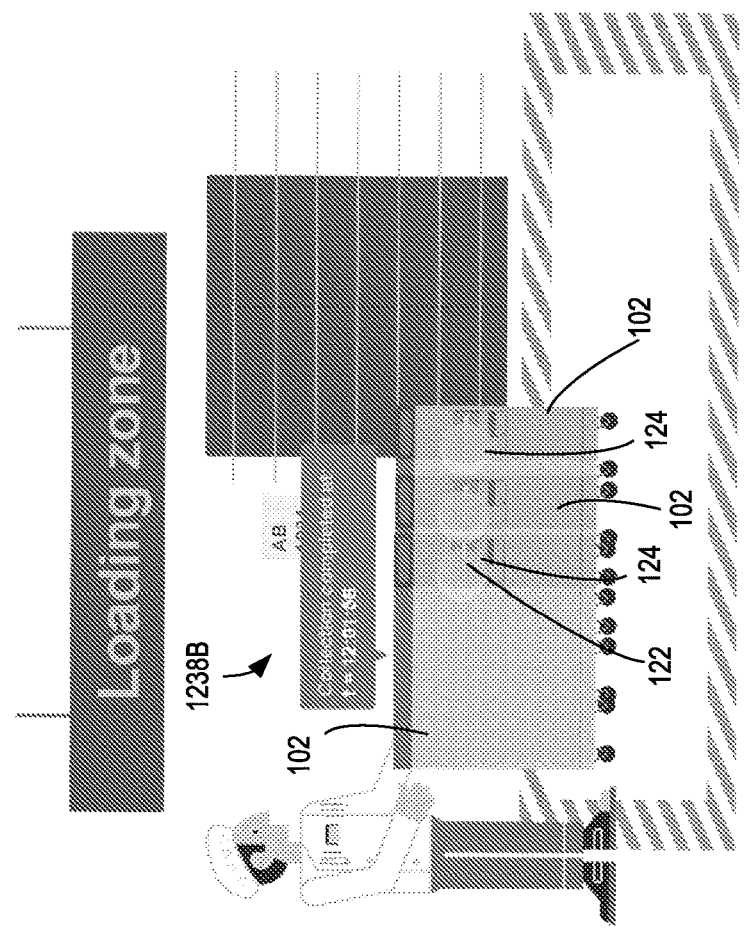
FIG. 14 illustrates another stage of the handler loading process of FIG. 1112
Figure 14:
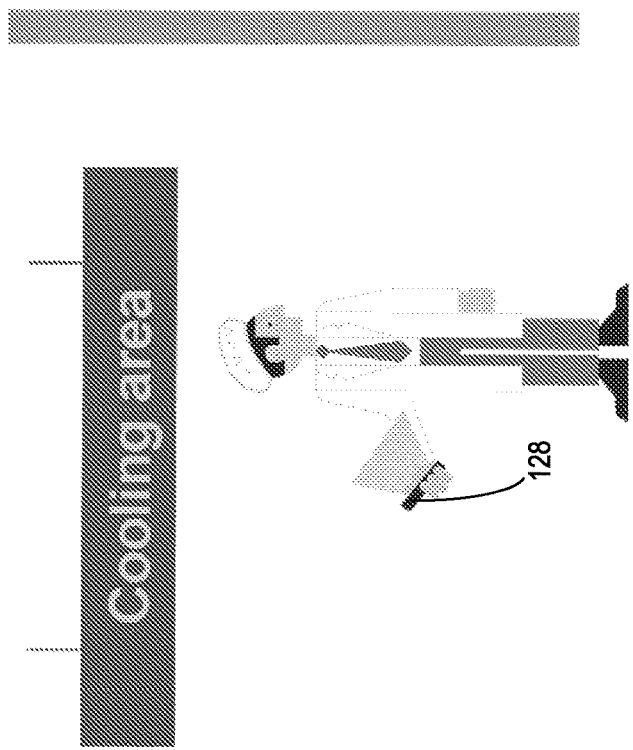

FIGS. 12-14 illustrate an example of a handler loading process that uses the process of FIG. 11. As illustrated in FIG. 12, a predefined area 1236 includes two trolley swarms 1238A-B, each including three trolleys 102. In FIG. 12, the handler device 128 is determined to be proximate to both trolley swarms 1238A-B, and the group identification of the handler signal from the handler device 128 matches the group identification of the trolley swarm 1238B. As illustrated in FIG. 12, the visual indicators 122 of each trolley 102 of the trolley swarm 1238B are activated to emit a visual transmission 124 having a first characteristic, and a notification 1240 is transmitted to the handler device 128. As illustrated in FIG. 14, upon the completion of the process associated with the handler device 128, the visual indicators 122 of each trolley 102 of the trolley swarm 1238B are activated to emit a visual transmission 124 having a second characteristic that is different from the first characteristic.

Figure 15:
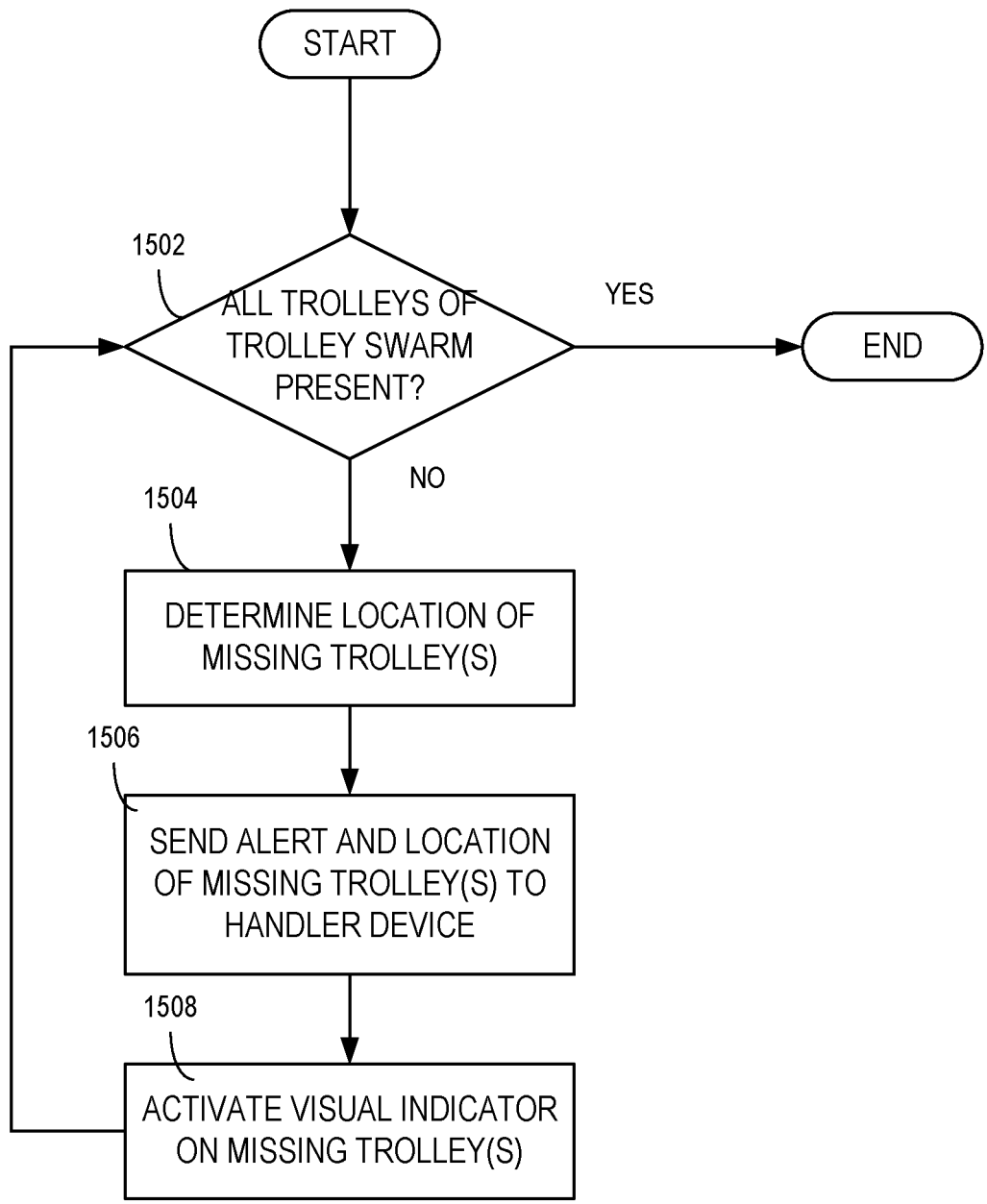
FIG. 15 is a flow chart of a locating process with the trolley of FIG. 1 according to aspects of the current disclosure.

FIG. 15 illustrates an example of a locating process that may be implemented by the trolley support system 100. The locating process may be implemented at any stage of the trolley supply chain, including concurrently with other processes.

In a block 1502, the process includes determining whether all trolleys of a trolley swarm are present. Determining whether all trolleys of the trolley swarm are present may be similar to block 1006 and based on proximity by comparing a detected signal strength of each trolley signal to a predetermined signal strength threshold. If the detected signal strength of at least one trolley is less than the predetermined signal strength threshold, the at least one trolley is not proximate to the trolley swarm.

In a block 1504, if at least one trolley of the trolley swarm is not present or missing, the method includes determining the location of the missing trolley. Determining the location of the missing trolley may include using a geolocation system, an indoor positioning system, and/or various other suitable systems to determine the location of the missing trolley.

In a block 1506, the method includes sending a notification of the missing trolley to the server and to at least one handler device. In some cases, block 1506 includes sending the location of the missing trolley determined in block 1504 to at least the at least one handler device.

In a block 1508, the process includes activating the visual indicator on the missing trolley such that the visual indicator emits a visual transmission having a locating characteristic.

Figure 16:
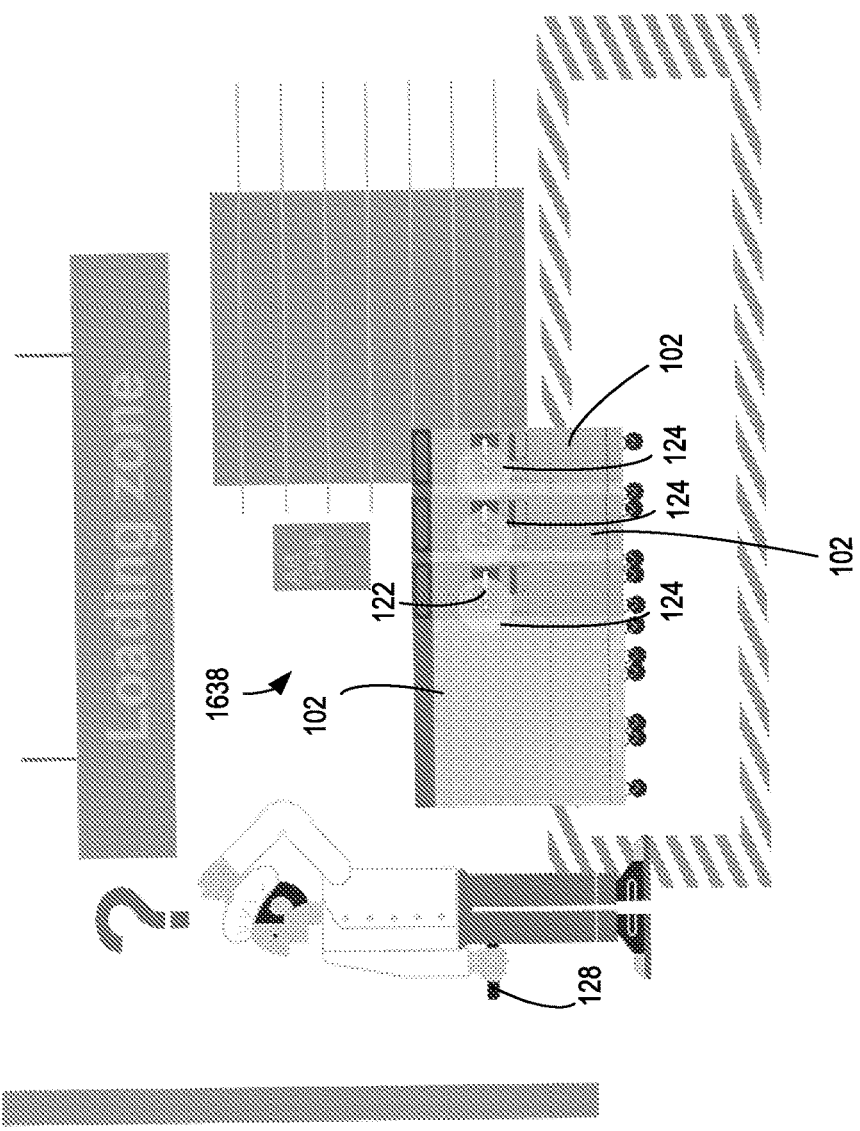
FIG. 16 illustrates a stage of a locating process of FIG. 15.
Figure 16:
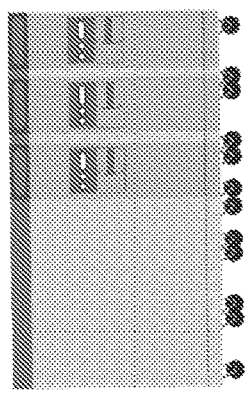
Figure 17:
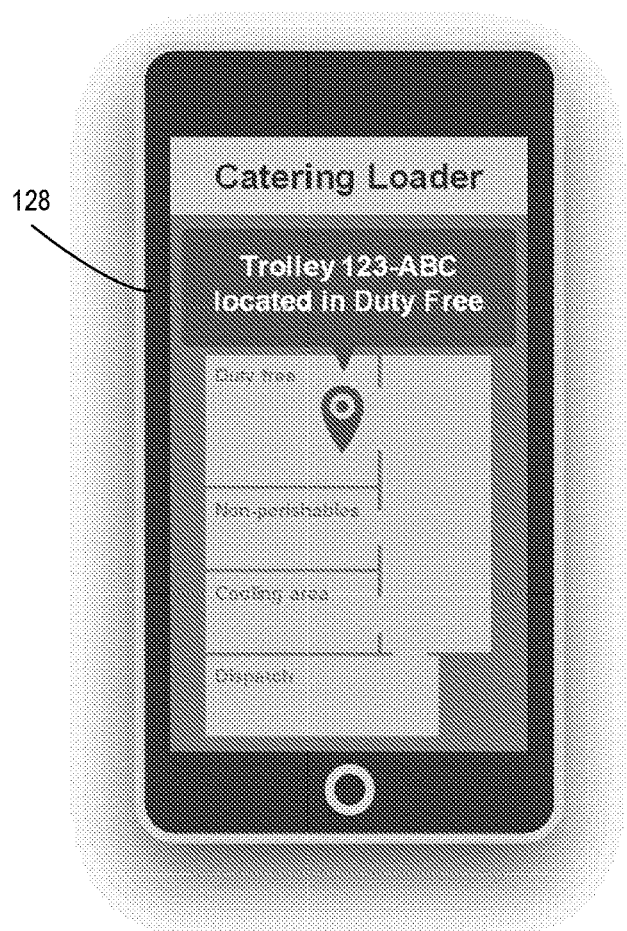
FIG. 17 illustrates a handler device during the locating process of FIG. 15.
Figure 18:
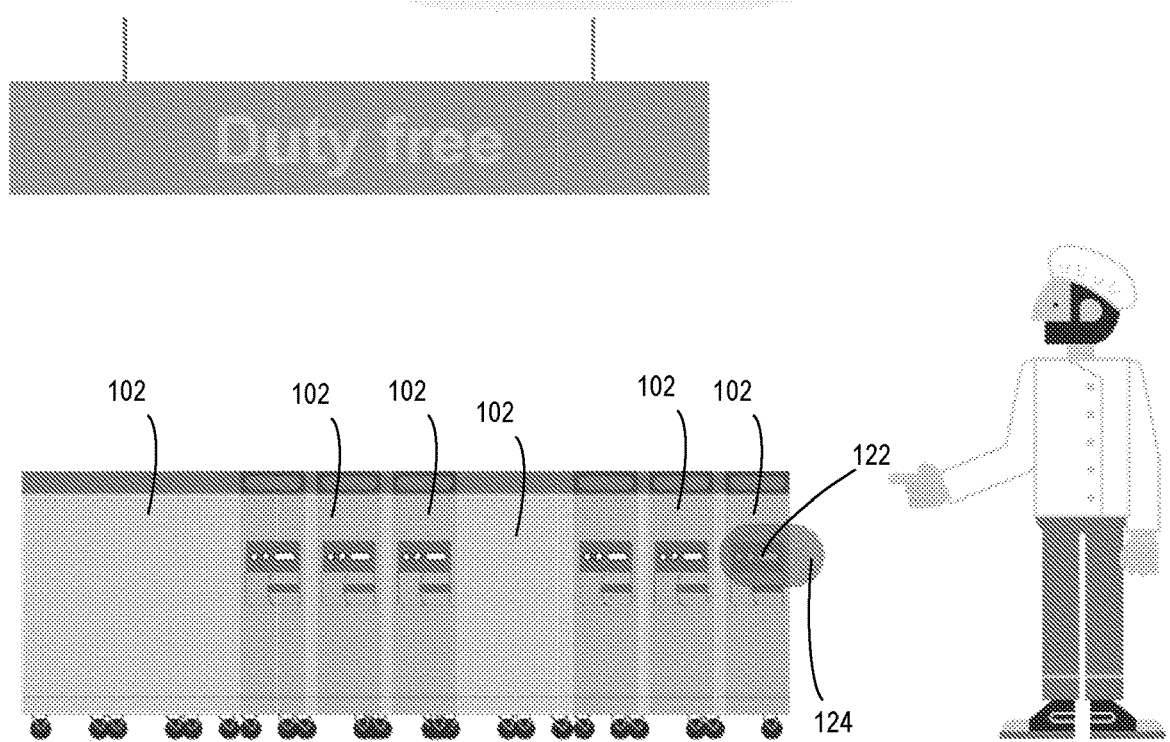
FIG. 18 illustrates another stage of the locating process of FIG. 15.

FIGS. 16-18 illustrate an example of the locating process of FIG. 15. In FIG. 16, a trolley swarm 1638 includes four trolleys 102, but one of the trolleys 102 is missing. FIG. 17 illustrates an example of a notification on the handler device 104 with location information of the missing trolley 102. FIG. 18 illustrates the missing trolley 102 with the visual indicator 122 activated to emit a visual transmission having a locating characteristic.

Figure 19:
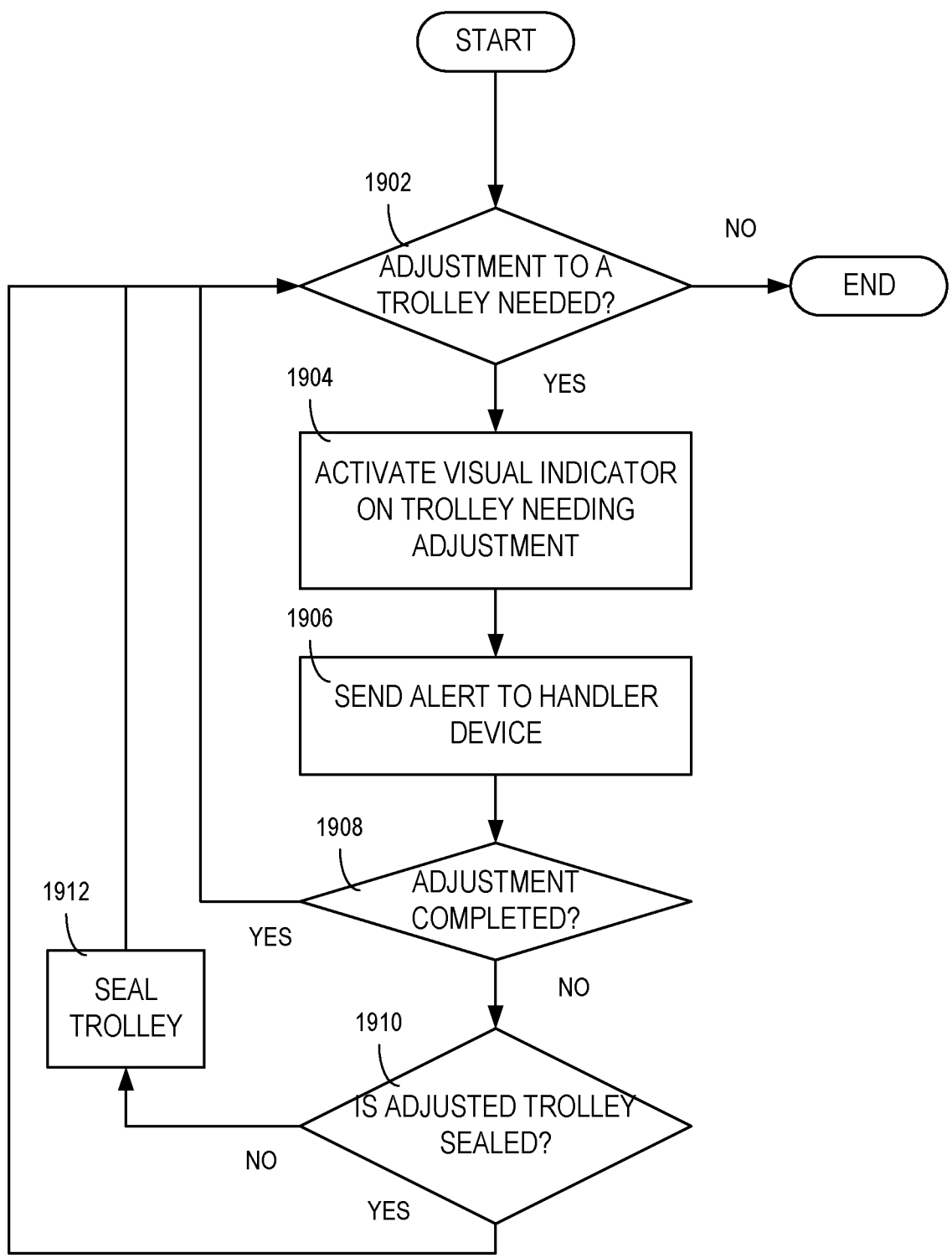
FIG. 19 is a flow chart of an active alert process with the trolley of FIG. 1 according to aspects of the current disclosure.

FIG. 19 illustrates an example of an active alert process that may be implemented by the trolley support system 100. The active alert process may be implemented at any stage of the trolley supply chain, including concurrently with other processes.

In a block 1902, the process includes determining whether adjustment to at least one trolley is needed. Block 1902 may include receiving a notification from the server and/or at least one handler device that an adjustment to the trolley is needed. As one non-limiting example, a handler device associated with the airline may send a notification that the meal in the trolley needs to be changed before delivery. Block 1902 may additionally or alternatively include receiving an alert from at least one control sensor of the trolley. As some non-limiting examples, the control sensor may send an alert that the door of the trolley is unlocked, a temperature within the internal compartment of the trolley is too hot or too cold, a humidity within the internal compartment is too high or too low, etc.

In a block 1904, the method includes activating the visual indicator on the trolley needing adjustment such that the visual indicator emits a visual transmission having an active alert characteristic. The active alert characteristic may be the same as or different from any of the aforementioned characteristics. Optionally, the active alert characteristic is different from the characteristic of the grouping process of FIG. 10 or the handler process of FIG. 11, although it need not be.

In a block 1906, the process includes sending a notification of the need for the adjustment to at least one handler device and the server.

In a block 1908, the process determines whether the adjustment to the trolley is completed. Block 1908 may include receiving a notification from a handler device, the server, and/or the control sensor of the trolley that the adjustment is completed.

In a block 1910, the process determines whether the adjusted trolley is sealed. Block 1910 may be similar to block 1014 and includes determining whether the door sensor of the adjusted trolley detects the door in the closed position or the unclosed position. If the door sensor of the sensor detects the unclosed position, the process proceeds to block 1912 and activates the door locking mechanism of the adjusted trolley to the locked configuration.

Figure 21:
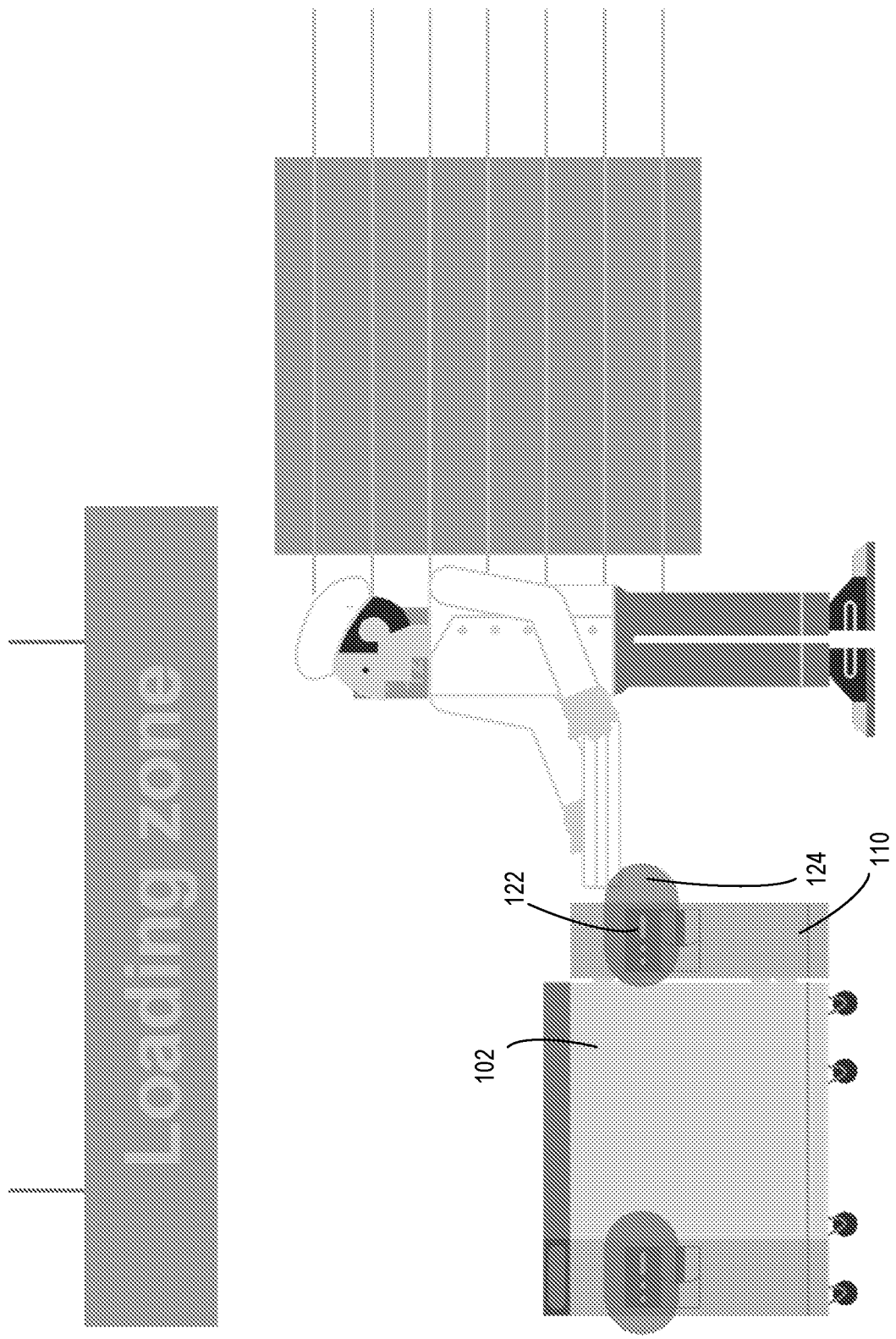
FIG. 21 illustrates another stage of the active alert process of FIG. 19.
Figure 22:
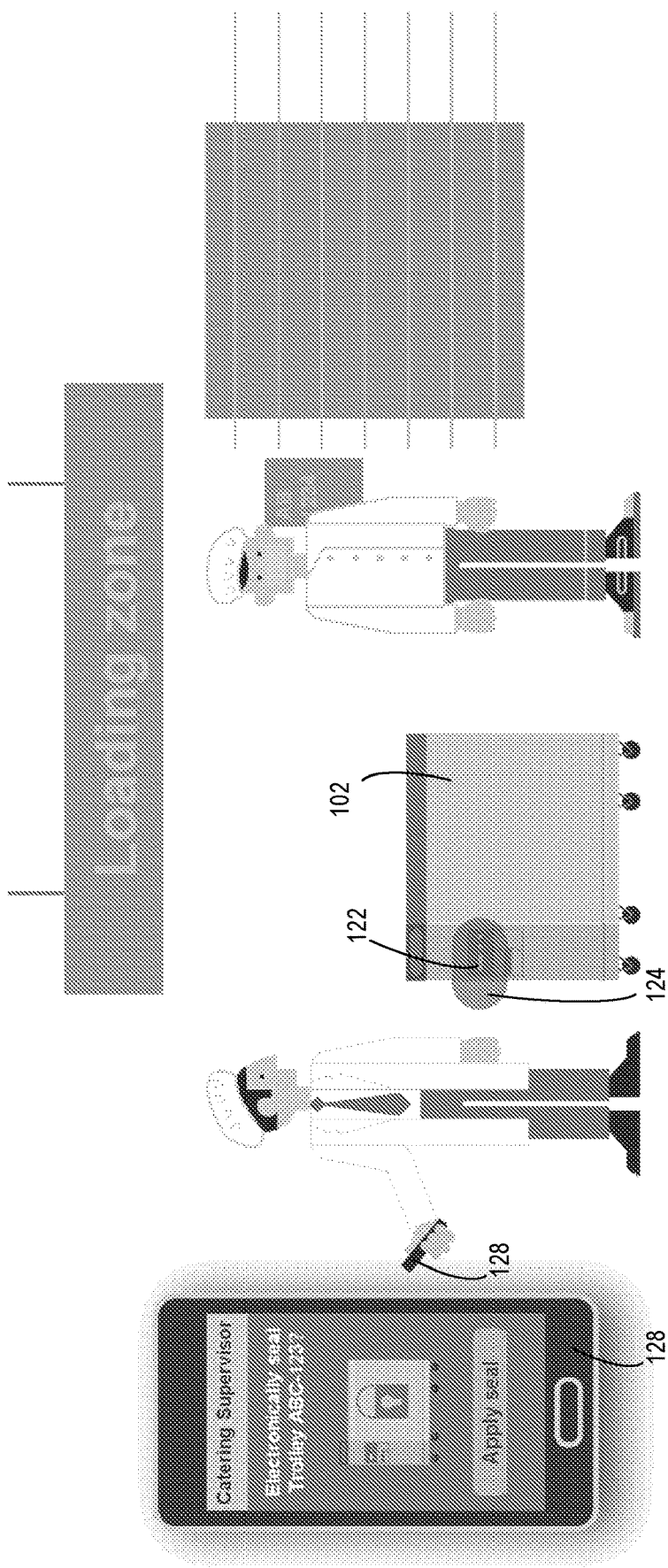
FIG. 22 illustrates another stage of the active alert process of FIG. 19.

FIGS. 20-22 illustrate an example of the active alert process of FIG. 19. In FIG. 20, one trolley 102 of a trolley swarm 2038 needs adjustment and the visual indicator 122 of the trolley 102 needing adjustment is activated such that the visual indicator 122 emits a visual transmission having the active alert characteristic. In FIG. 21, the trolley 102 needing adjustment is adjusted by adding in additional meal and beverage items into the trolley 102 as requested by the caterer or the airline. In FIG. 22, after the trolley 102 has been adjusted, the trolley 102 is resealed.

Figure 23:
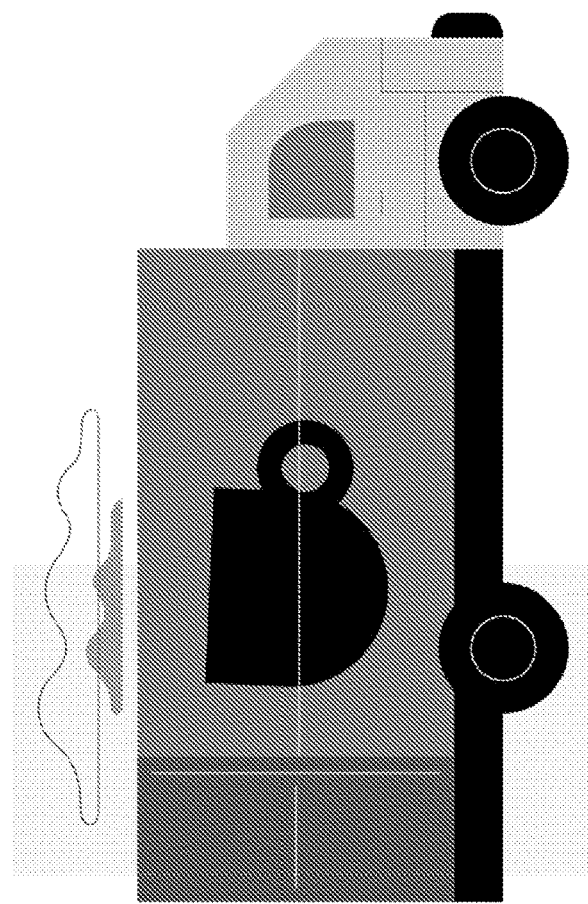
FIG. 23 illustrates a stage of a handler loading and transport process according to aspects of the current disclosure.
Figure 23:
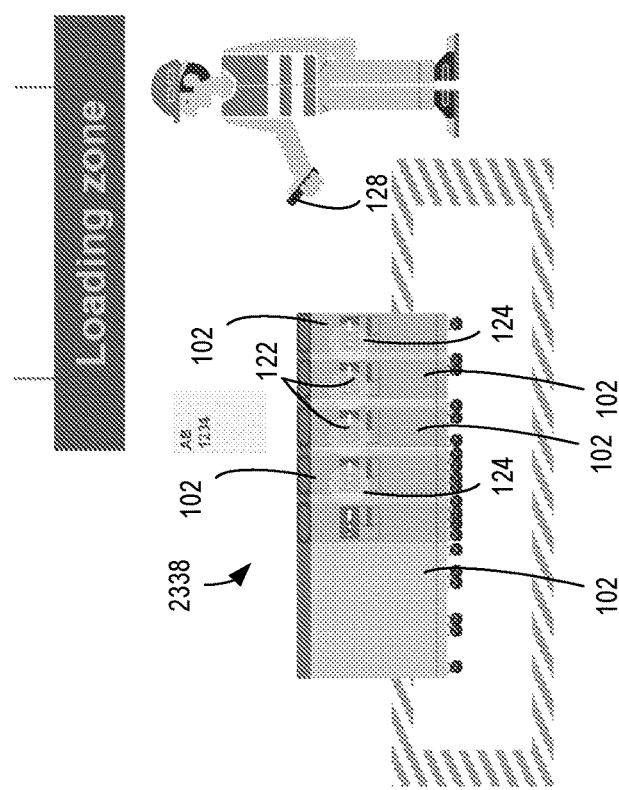
Figure 24:
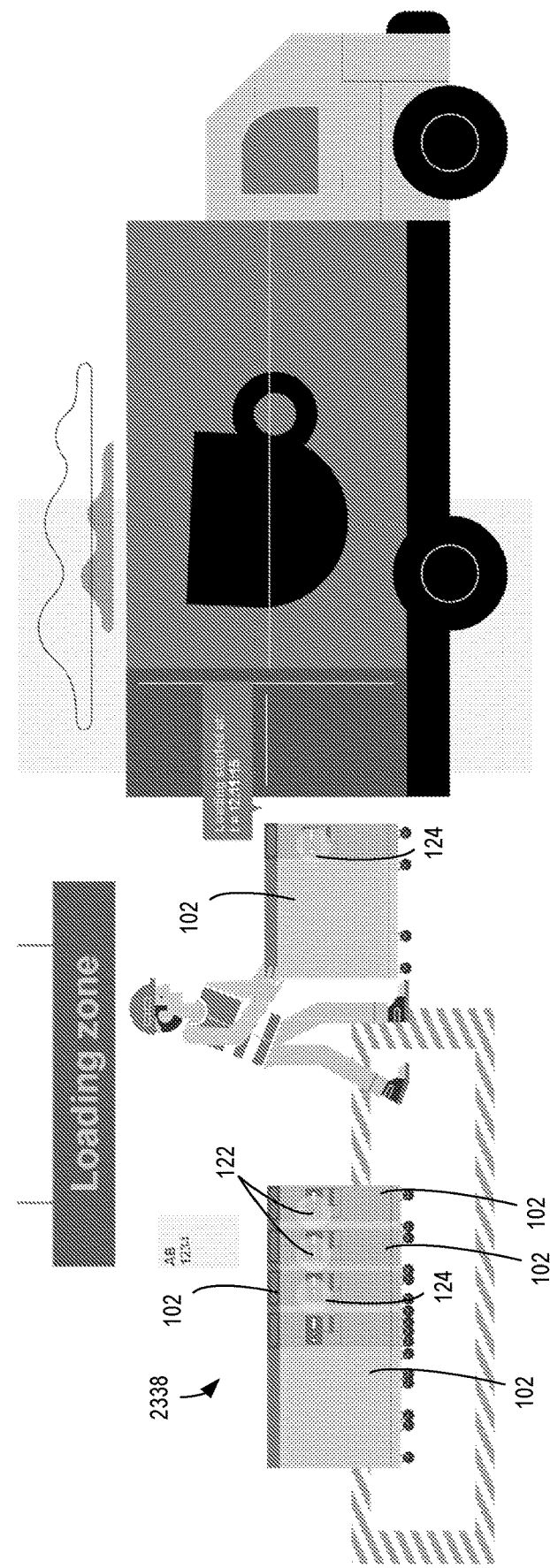
FIG. 24 illustrates another stage of the handler loading and transport process of FIG. 23.
Figure 25:
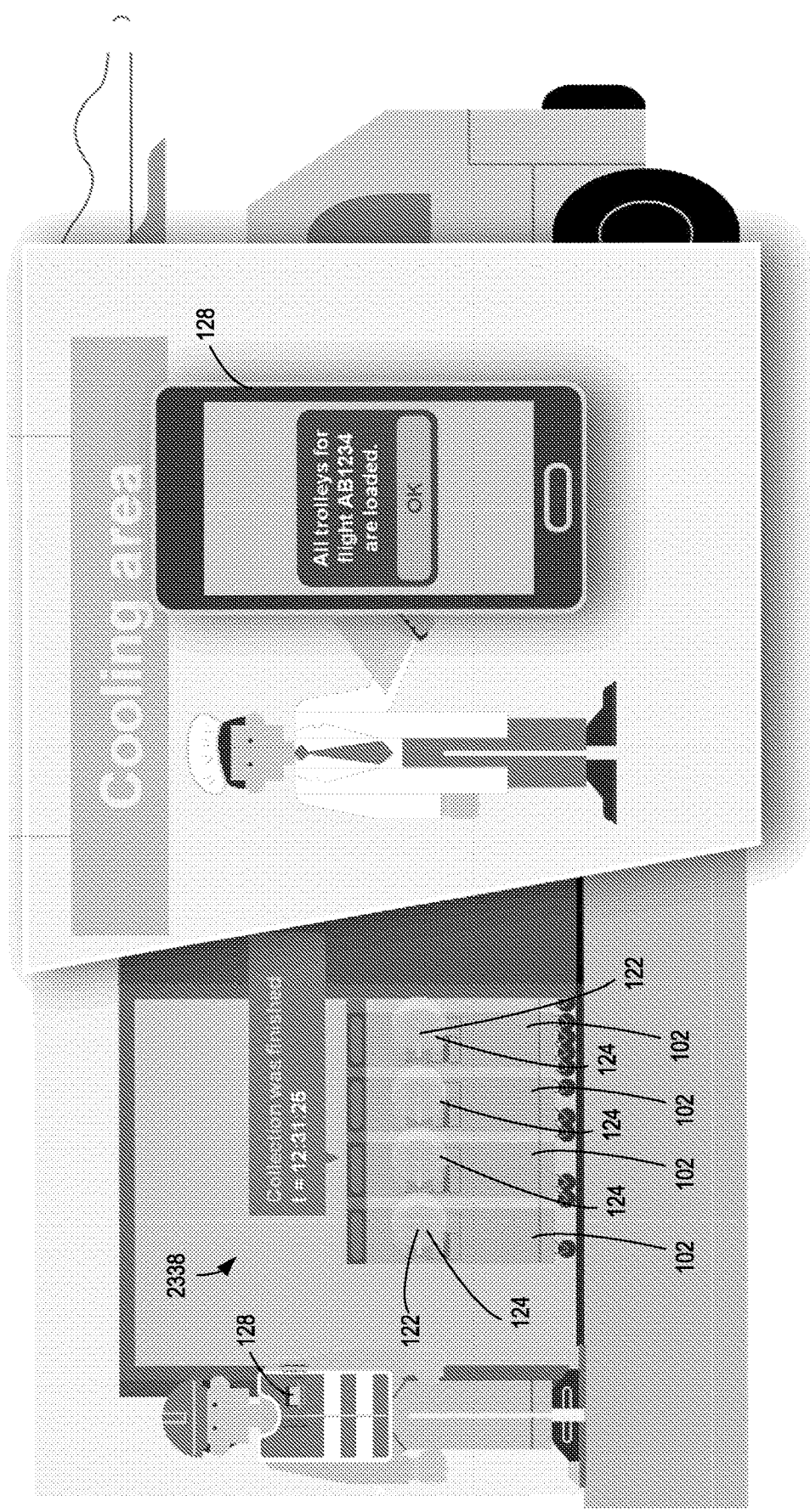
FIG. 25 illustrates another stage of the handler loading and transport process of FIG. 23.
Figure 26:
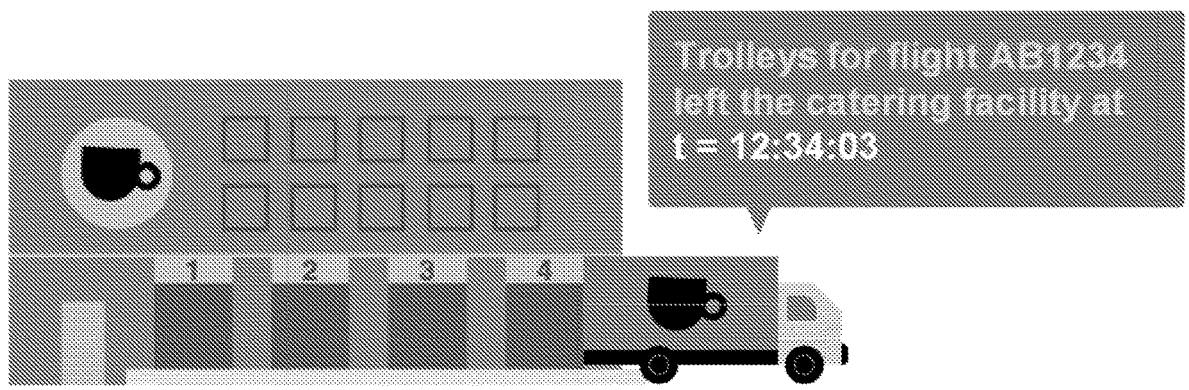
FIG. 26 illustrates another stage of the handler loading and transport process of FIG. 23.
Figure 27:
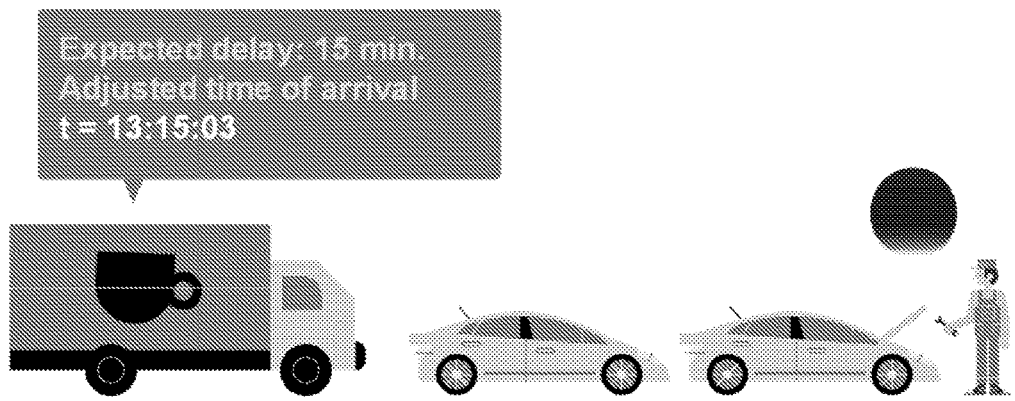
FIG. 27 illustrates another stage of the handler loading and transport process of FIG. 23.

FIGS. 23-27 illustrate a handler loading and transport process using the handler process of FIG. 11. In FIG. 23, visual indicators 122 of trolleys 102 of a trolley swarm 2338 are activated to emit a visual transmission having a first characteristic after the swarm is connected with the handler device 104. In FIG. 25, the visual indicators 122 of the trolleys 102 are activated to emit a visual transmission having a second characteristic after a portion of the process is completed. As illustrated in FIG. 25, a notification is sent to a handler device 104 that is different from the handler device 104 proximate to the trolley swarm 2338. In FIG. 27, at least one trolley 102 of the trolley swarm 2338 may transmit a notification to one or more handler devices 104 and/or the server 126 upon determining a delay in process time. Determining the delay may include comparing an actual process time to an expected process time and sending a notification if the actual process time does not match the expected process time.

Figure 28:
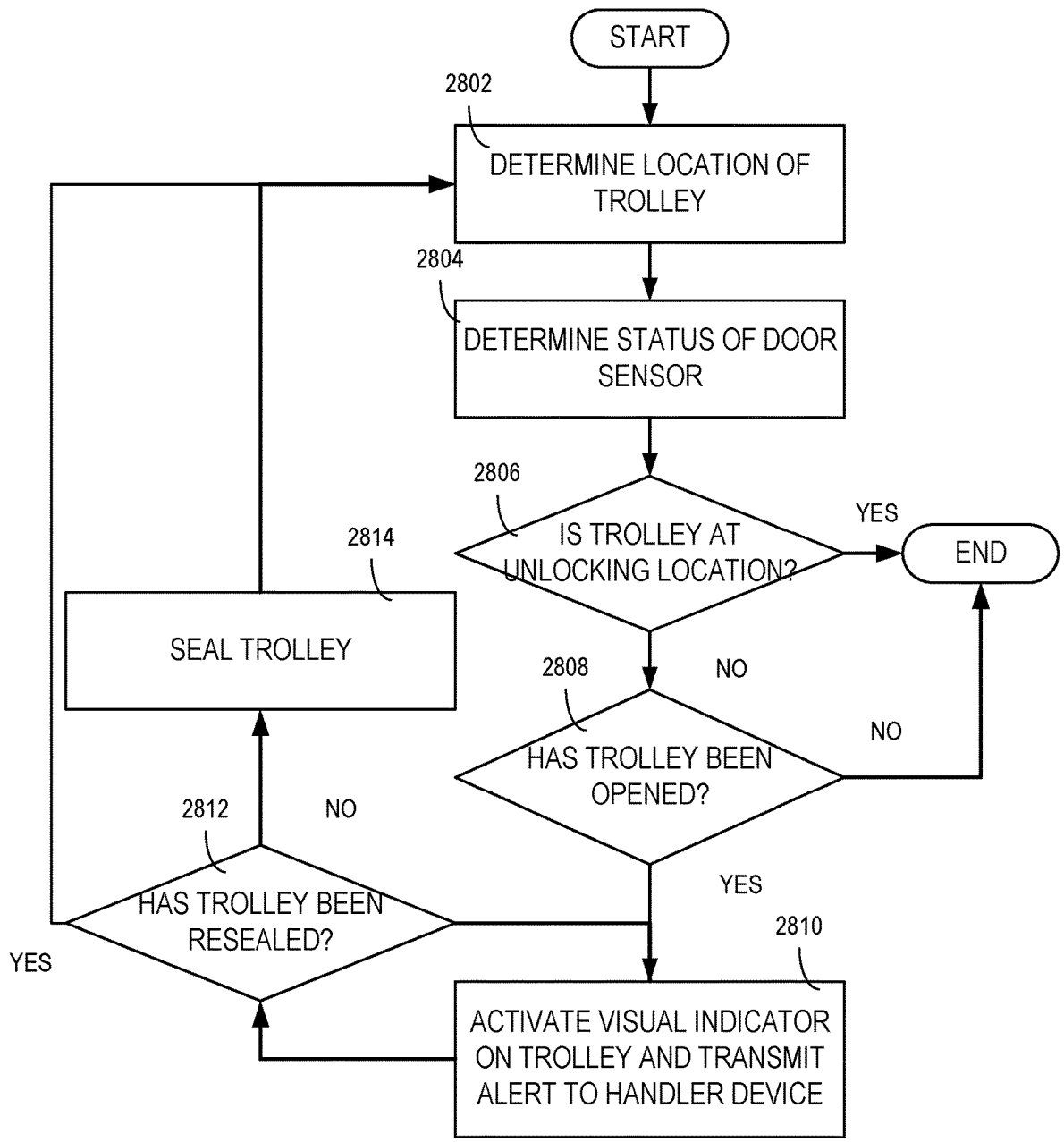
FIG. 28 is a flow chart of a tamper process with the trolley of FIG. 1 according to aspects of the current disclosure.

FIG. 28 illustrates an example of a tampering alert process that may be implemented by the trolley support system 100. The tampering alert process may be implemented at any stage of the trolley supply chain, including concurrently with other processes.

In a block 2802, the tampering alert process includes determining a location of the trolley. Block 2802 may include determining the location of the trolley and comparing it to a predefined end location and/or determining a process duration time from a process start time and comparing the process duration time to a predefined process end time.

In a block 2804, the process includes determining a status of the door sensor of the trolley.

In a block 2806, the process includes determining whether the trolley is at the predefined end location and/or determining whether the trolley is at the predefined process end time.

In a block 2808, the process includes determining whether the door of the trolley has been opened. This may be detected by a door sensor on the trolley. Various types of door sensors may function by a magnetic or electrical field that changes when the door is opened, indicating to the system that the seal has been broken. If the trolley door has been opened at a point in the transportation process that indicates a security breach, that breach will be indicated by the system. This may be a visual or auditory or other type of alert that may be displayed on or emitted from the trolley. Additionally or alternatively, the alert may be delivered to an operator or other stakeholder in the trolley transportation process.

In a block 2810, if the trolley door has been opened and the trolley is not at the predefined end location and/or the trolley is not at the predefined process end time, the process includes activating the visual indicator of the trolley with the opened door such that the visual indicator emits a tampering characteristic. The tampering characteristic may optionally be different from the characteristics discussed with reference to FIGS. 10 and 11, although it need not be. Optionally, the tampering characteristic is the same as the active alert characteristic of FIG. 19, although it need not be. Block 2810 may include sending a notification to at least one handler device and/or the server. This may be a particular colored light, an X indication, a beeping sound that the trolley emits until the security breach has been checked and managed to ensure that no tampering has occurred, a wheel lock, or any other appropriate notification or indication.

In a block 2812, the process determines whether the trolley has been resealed by determining whether the door sensor of the adjusted trolley detects the door in the closed position or the unclosed position. If the door sensor of the sensor detects the unclosed position, the process proceeds to block 2814 and activates the door locking mechanism of the adjusted trolley to the locked configuration.

Figure 29:
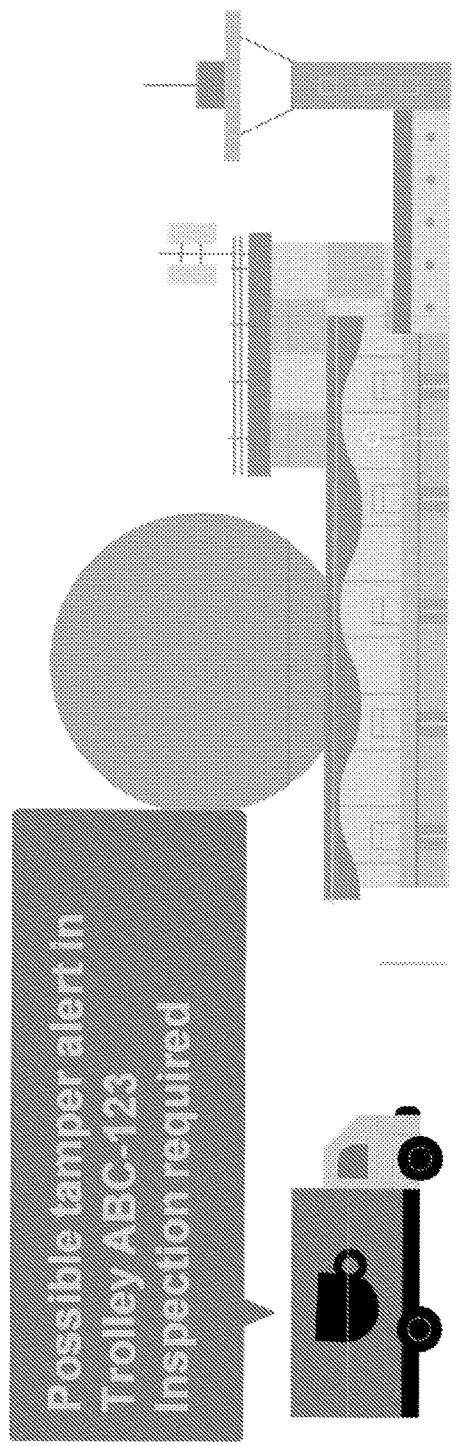
FIG. 29 illustrates a stage of the tamper process of FIG. 28.
Figure 30:
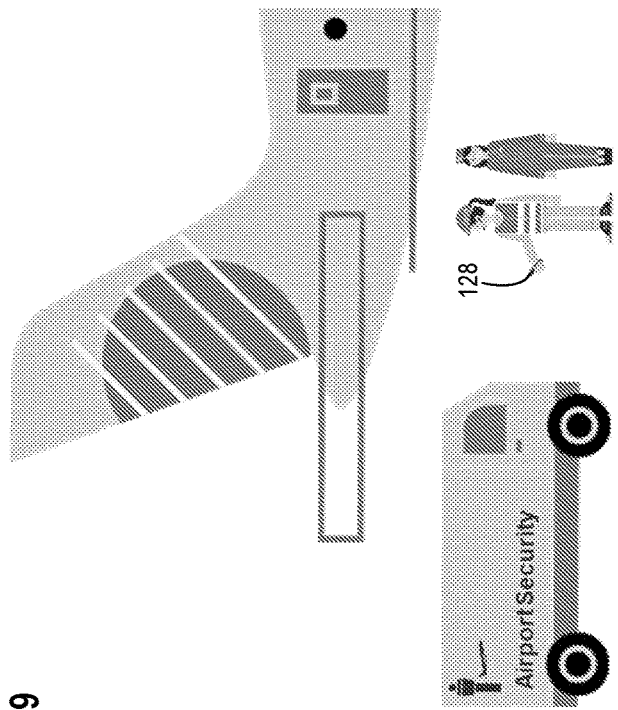
FIG. 30 illustrates another stage of the tamper process of FIG. 28.
Figure 30:
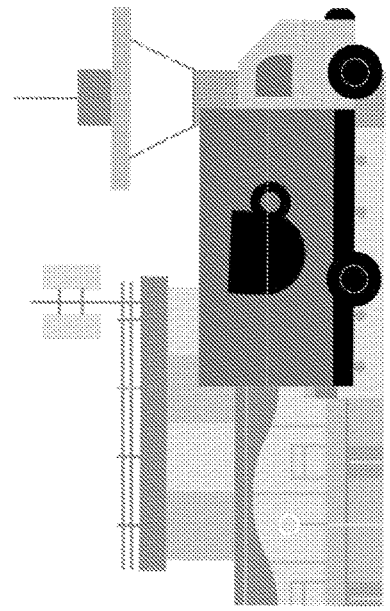
Figure 31:
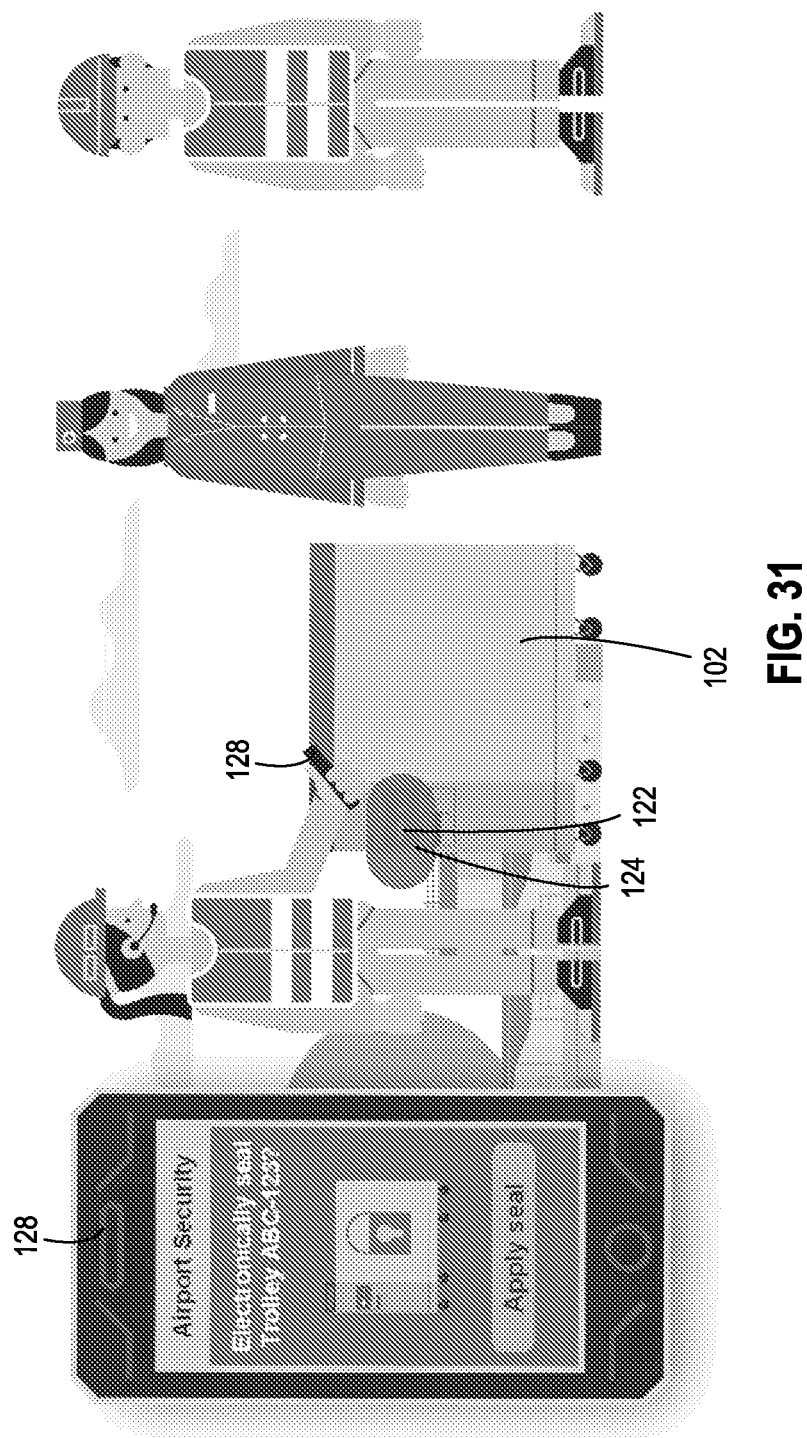
FIG. 31 illustrates another stage of the tamper process of FIG. 28.
Figure 32:
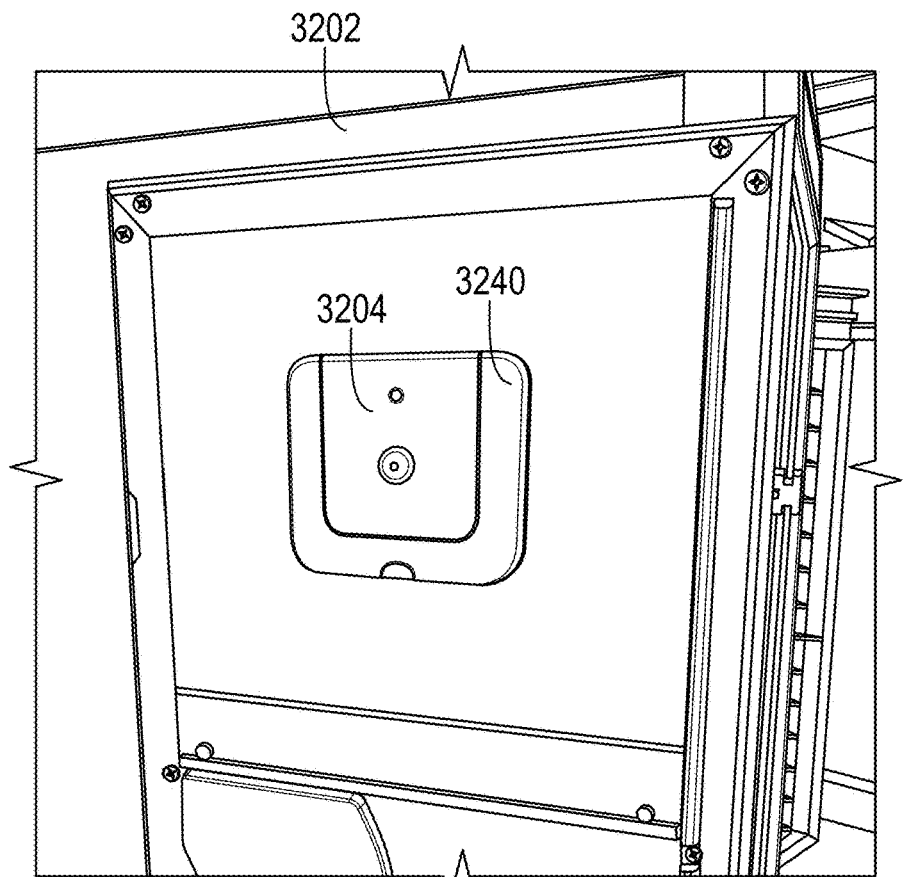
FIG. 32 illustrates a trolley with a trolley node according to aspects of the current disclosure.
Figure 33:
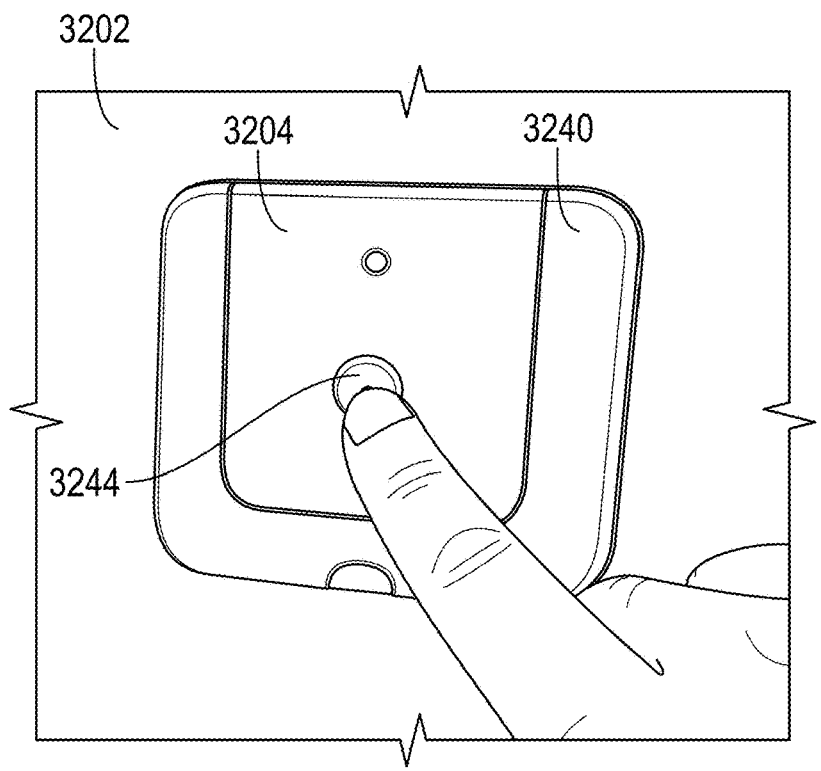
FIG. 33 is another view of the trolley with the trolley node of FIG. 32.

FIGS. 29-31 illustrate an example of the tampering process of FIG. 28. In FIG. 29, a trolley determines that its door is open and the trolley is not at the predefined end location and transmits a notification to at least one handler device. In certain examples, and as illustrated in FIG. 30, the notification may be sent to handler devices 104 associated with a plurality of stakeholders, such as airport security and the airline. FIG. 31 illustrates the trolley 102 with the visual indicator 122 emitting the visual transmission 124 having the tamper characteristic. As illustrated in FIG. 31, after the trolley 102 has been checked and it has been determined that no security breach or tampering concern has taken place, the trolley 102 may be resealed. It is possible to annotate the incident on a record log.

Figure 34:
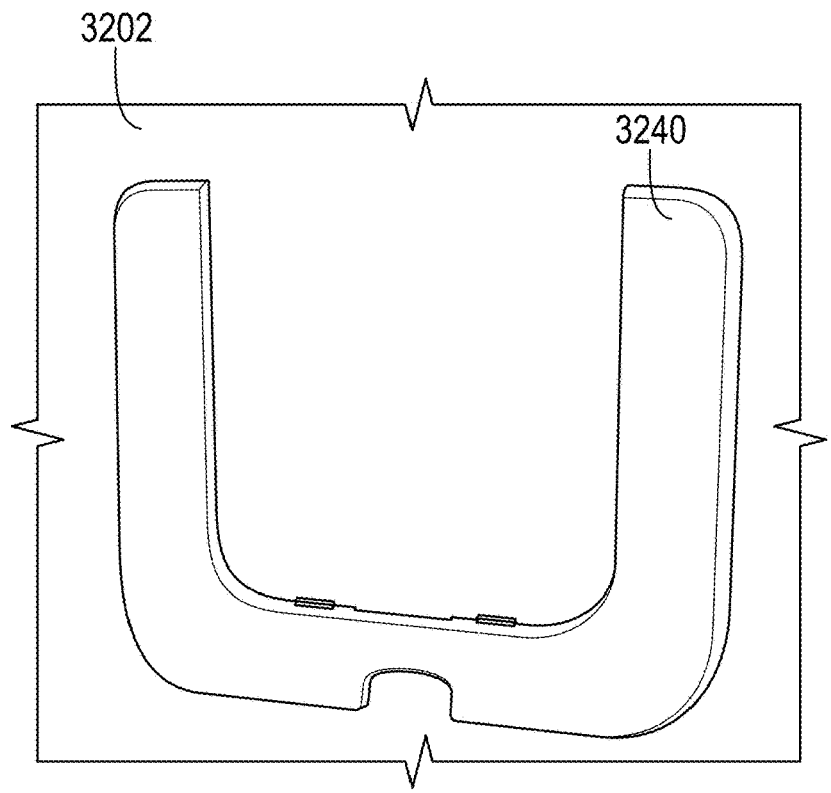
FIG. 34 illustrates a node bracket for the trolley node of FIG. 32.
Figure 35:
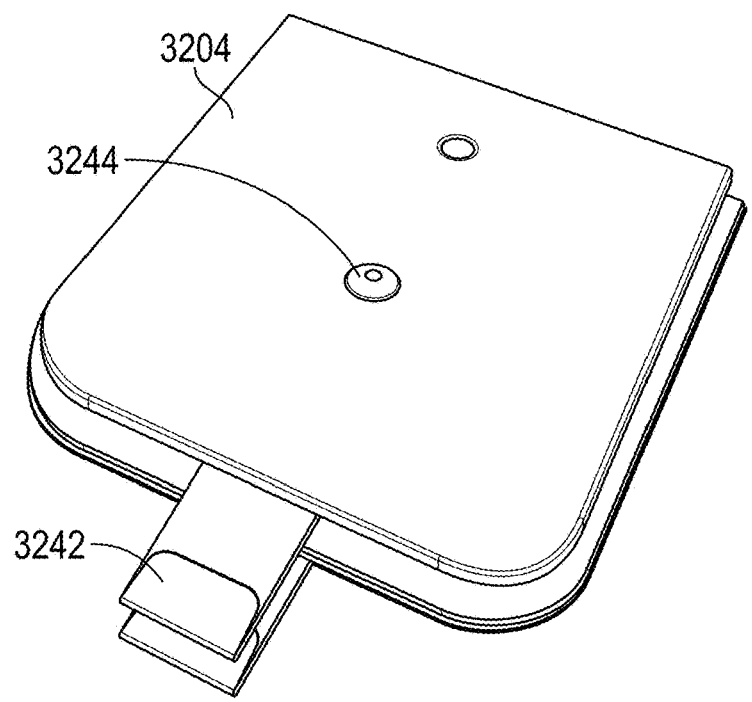
FIG. 35 illustrates the trolley node of FIG. 32.
Figure 38:
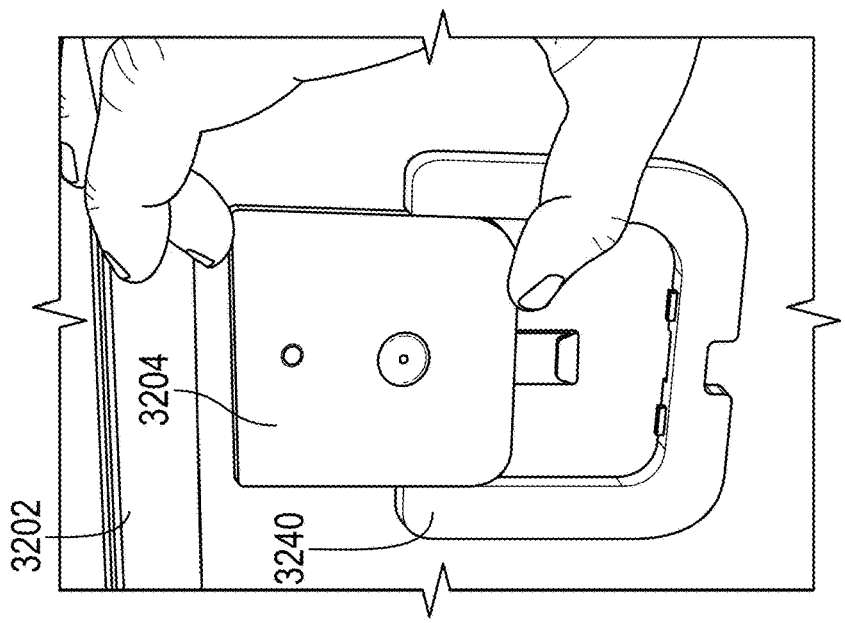
FIG. 38 illustrates the trolley of FIG. 32 with the trolley node further removed from the node bracket.
Figure 37:
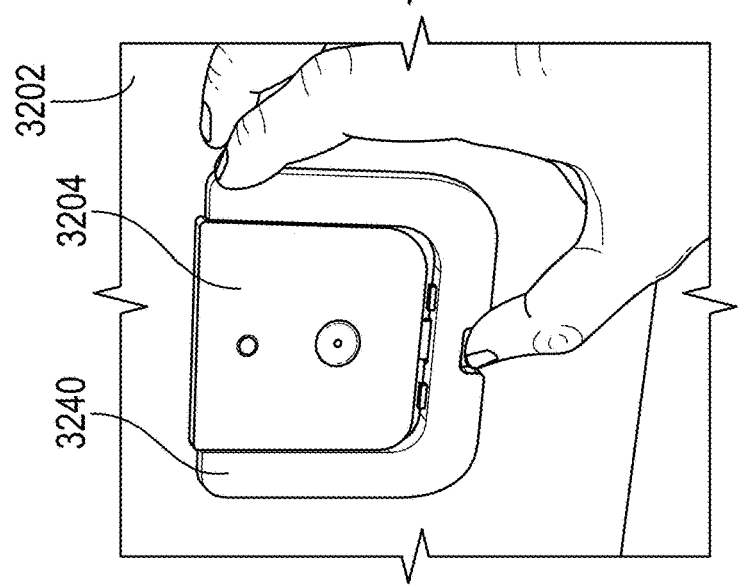
FIG. 37 illustrates the trolley of FIG. 32 with the trolley node partially removed from the node bracket.
Figure 36:
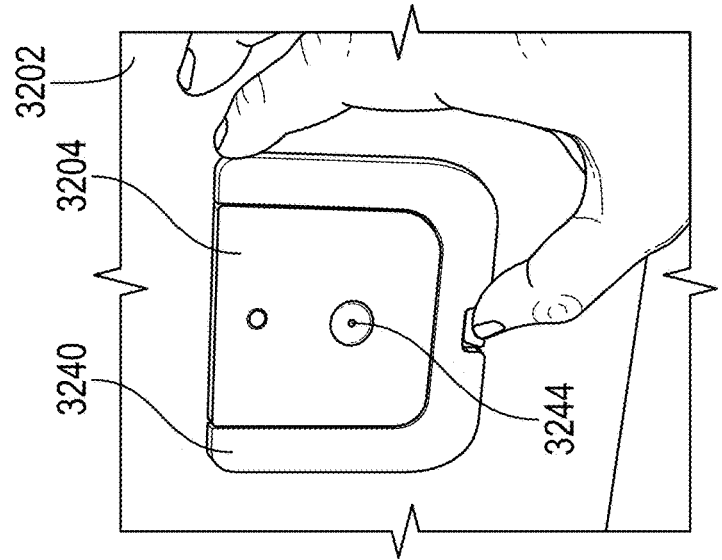
FIG. 36 is another view of the trolley and trolley node of FIG. 32.

FIGS. 32-38 illustrate another example of a trolley 3202 with a trolley node 3204. The trolley 3202 is substantially similar to the trolley 102 except that the trolley node 3204 is removable from the trolley 3202. In this example, a node bracket 3240 is provided on the trolley 3202. As best illustrated in FIG. 34, in some cases, the node bracket 3240 includes a shape that is complimentary to the shape of the trolley node 3204. Optionally, the trolley node 3204 includes a locking mechanism 3242 that selectively secures the trolley node 3204 with the node bracket 3240. Compared to the trolley node 104, the trolley node 3204 includes one visual indicator 122 that provides a plurality of visual transmissions having various characteristics based on various processes, detected data, etc. discussed previously. Optionally, compared to the trolley node 104, the trolley node 3204 includes an activation button 3244 to selectively activate or deactivate the trolley node 3204. In some cases, the activation button 3244 automatically connects the trolley node 3204 to the server 126. It will be appreciated that in other examples, various other suitable types of node brackets may be utilized to position a trolley node on a trolley.

A collection of exemplary embodiments, including at least some explicitly enumerated as Examples, providing additional description of a variety of embodiment types in accordance with the concepts described herein are provided below. These examples are not meant to be mutually exclusive, exhaustive, or restrictive; and the disclosure is not limited to these example embodiments but rather encompasses all possible modifications and variations within the scope of the issued claims and their equivalents.

Example 1. A trolley comprising: a housing comprising an internal compartment and a door configured to provide selective access to the internal compartment, wherein the door is movable between a closed position and an unclosed position; and a control sensor configured to detect at least one characteristic of the trolley.

Example 2. The trolley of any of the preceding or subsequent example combinations, wherein the control sensor is a door sensor and wherein the at least one characteristic comprises a position of the door between the closed position and the unclosed position.

Example 3. The trolley of any of the preceding or subsequent example combinations, further comprising a trolley node in communication with the door sensor, wherein the trolley node comprises a controller and a locking mechanism activatable between a locked configuration and an unlocked configuration, and wherein the controller is configured to activate the locking mechanism to the locked configuration based on the door sensor detecting the door in the closed position.

Example 4. The trolley of any of the preceding or subsequent example combinations, further comprising a visual indicator connected to the door sensor, wherein the visual indicator is configured to emit a first visual transmission based on the door sensor detecting the door in the closed position and a second visual transmission based on the door sensor detecting the door in the unclosed position.

Example 5. The trolley of any of the preceding or subsequent example combinations, wherein the control sensor is a temperature sensor and wherein the at least one characteristic comprises a temperature of the internal compartment.

Example 6. A trolley system comprising: a trolley comprising a housing, the housing comprising an internal compartment and a door configured to provide selective access to the internal compartment, wherein the door is movable between a closed position and an unclosed position; and a trolley node comprising a controller and a sealing module, the sealing module comprising: a door sensor configured to detect a position of the door between the closed position and the unclosed position; and a locking mechanism activatable between a locked configuration and an unlocked configuration, wherein the controller is configured to selectively activate the locking mechanism to the locked configuration based at least on the door sensor detecting the door in the closed position.

Example 7. The trolley system of any of the preceding or subsequent example combinations, wherein the trolley node further comprises a visual indicator, and wherein the controller is configured to activate the visual indicator to emit a first visual transmission based on the locking mechanism being in the locked configuration.

Example 8. The trolley system of any of the preceding or subsequent example combinations, wherein the trolley node further comprises a temperature sensor configured to detect a temperature within the internal compartment, and wherein the controller is configured to activate the visual indicator to emit a second visual transmission based on the detected temperature being above a threshold temperature.

Example 9. The trolley system of any of the preceding or subsequent example combinations, wherein the trolley node further comprises a positioning module configured to detect a location of the trolley, and wherein the controller is configured to selectively activate the door locking mechanism to the locked configuration based at least on a change in location of the trolley detected by the positioning module from a first location to a second location.

Example 10. The trolley of any of the preceding or subsequent example combinations, wherein the positioning module comprises a Bluetooth beacon.

Example 11. The trolley system of any of the preceding or subsequent example combinations, wherein the trolley node is removable from the trolley.

Example 12. The trolley system of any of the preceding or subsequent example combinations, further comprising a node bracket secured to the housing of the trolley, wherein the trolley node is selectively positionable within the node bracket such that the trolley node is removable from the trolley.

Example 13. The trolley system of any of the preceding or subsequent example combinations, wherein the trolley node further comprises a communication module connected to the controller and comprising a wireless beacon, wherein the wireless beacon comprises an antenna.

Example 14. A method of controlling a trolley system, the method comprising: establishing, by a first trolley, a connection with a second trolley and receiving, by the first trolley, a trolley signal from the second trolley, wherein the trolley signal comprises a group identification of the second trolley; determining, by the first trolley, a signal strength of the trolley signal and comparing the determined signal strength to a predetermined signal strength threshold; comparing, by the first trolley, the group identification of the second trolley to a group identification of the first trolley; and pairing, by the first trolley, the second trolley with the first trolley based on the determined signal strength being at least the predetermined signal strength and the group identification of the second trolley matching the group identification of the first trolley, wherein pairing the second trolley with the first trolley comprises activating a visual indicator of the first trolley and a visual indicator of the second trolley such that both visual indicators emit a first visual transmission.

Example 15. The method of any of the preceding or subsequent example combinations, further comprising activating the visual indicator of the first trolley to emit the first visual transmission and activating the visual indicator of the second trolley to emit a second visual transmission based on the determined signal strength being at least the predetermined signal strength and the group identification of the second trolley differing from the group identification of the first trolley, wherein the second visual transmission is different from the first visual transmission.

Example 16. The method of any of the preceding or subsequent example combinations, further comprising: determining, by the first trolley, a number of additional trolleys paired with the first trolley; comparing, by the first trolley, the number of paired additional trolleys to a predetermined swarm number; activating the visual indicator of the first trolley to emit the first visual transmission based on the number of paired additional trolleys being less than the predetermined swarm number; and activating the visual indicator of the first trolley to emit a second visual transmission based on the number of paired additional trolleys being at least the predetermined swarm number.

Example 17. The method of any of the preceding or subsequent example combinations, further comprising: determining, by the first trolley, a status of a door seal indicator of the second trolley based on the second trolley being paired with the first trolley; activating the visual indicator of the second trolley to emit a second visual transmission based on an unsealed status of the door seal indicator; and transmitting, by the first trolley, an unsealed door notification to a handler device based on the unsealed status of the door seal indicator.

Example 18. The method of any of the preceding or subsequent example combinations, further comprising: receiving, by the first trolley, a handler signal from a handler device, wherein the handler signal comprises a group identification and a process start identification; comparing, by the first trolley, the group identification of the handler signal to the group identification of the first trolley; and activating the visual indicators of the first trolley and the second trolley to emit a second visual transmission based on the group identification of the handler signal matching the group identification of the first trolley.

Example 19. The method of any of the preceding or subsequent example combinations, further comprising: determining, by the first trolley, a signal strength of the trolley handler and comparing the determined signal strength to the predetermined signal strength threshold, wherein activating the visual indicators of the first trolley and the second trolley is based on the determined handler signal strength being at least the predetermined signal strength.

Example 20. A method of controlling a trolley system, the method comprising: forming a swarm of trolleys, the swarm of trolleys comprising a group identification; receiving, by a first trolley of the swarm of trolleys, a handler signal from a handler device, wherein the handler signal comprises a group identification and a process start identification; comparing, by the first trolley, the group identification of the handler signal to the group identification of the swarm of trolleys; and activating a visual indicator on each trolley of the swarm of trolleys to emit a first visual transmission based on the group identification of the handler signal matching the group identification of the swarm of trolleys.

Example 21. The method of any of the preceding or subsequent example combinations, wherein the handler signal is a first handler signal, and wherein the method further comprises: receiving, by the first trolley, a second handler signal from the handler device, the second handler signal comprising the group identification and a process end identification; and locating, by the first trolley, each trolley of the swarm of trolleys, wherein locating comprises: receiving by the first trolley a trolley signal from each of the trolleys of the swarm of trolleys; comparing by the first trolley a signal strength of each trolley signal to a predetermined signal strength; activating the visual indicator of each trolley of the swarm of trolleys to emit a second visual transmission based on the signal strength of the trolley signal from at least one trolley being less than the predetermined signal strength; sending a location of the at least one trolley comprising the trolley signal less than the predetermined signal strength based on the signal strength of the trolley signal from the at least one trolley being less than the signal strength; and activating the visual indicator on each trolley of the swarm of trolleys to emit a third visual transmission based on the signal strength of the trolley signal from each trolley being at least the predetermined signal strength.

Example 22. The method of any of the preceding or subsequent example combinations, further comprising: determining, by the first trolley, a status of a door seal indicator of each trolley of the swarm of trolleys; activating the visual indicator of at least one trolley to emit a second visual transmission based on an unsealed status of the door seal indicator of the at least one trolley; and transmitting, by the first trolley, an unsealed door notification to the handler device based on the unsealed status of the door seal indicator of the at least one trolley.

Example 23. The method of any of the preceding or subsequent example combinations, wherein forming the swarm of trolleys comprises: establishing, by the first trolley, a connection with a second trolley and receiving, by the first trolley, a trolley signal from the second trolley, wherein the trolley signal comprises a group identification of the second trolley; determining, by the first trolley, a signal strength of the trolley signal and comparing the determined signal strength to a predetermined signal strength threshold; comparing, by the first trolley, the group identification of the second trolley to a group identification of the first trolley; and pairing, by the first trolley, the second trolley with the first trolley based on the determined signal strength being at least the predetermined signal strength and the group identification of the second trolley matching the group identification of the first trolley, wherein pairing the second trolley with the first trolley comprises defining the first trolley and the second trolley as the swarm of trolleys and activating the visual indicator of the first trolley and the visual indicator of the second trolley such that both visual indicators emit a second visual transmission.

Example 24. The method of any of the preceding or subsequent example combinations, further comprising: determining, by the first trolley, a status of a door seal indicator of each trolley of the swarm of trolleys; determining the location of the swarm of trolleys based on the handler device; comparing the determined location to a predefined end location; and activating the visual indicator of at least one trolley of the swarm of trolleys to emit a second visual transmission and transmitting a tamper alert to the handler device based on an unsealed status of the door seal indicator of the at least one trolley and the determined location not being the predefined end location.

Example 25. The method of any of the preceding or subsequent example combinations, wherein the handler signal comprises a process start time, and wherein the method further comprises: determining, by the first trolley, a status of a door seal indicator of each trolley of the swarm of trolleys; determining the process duration time from the process start time; comparing the process duration time to a predefined process end time; and activating the visual indicator of at least one trolley of the swarm of trolleys to emit a second visual transmission and transmitting a tamper alert to the handler device based on an unsealed status of the door seal indicator of the at least one trolley and the process duration time not being the predefined process end time.

Different arrangements of the components depicted in the drawings or described above, as well as components and steps not shown or described are possible. Similarly, some features and sub-combinations are useful and may be employed without reference to other features and sub-combinations. Examples of the disclosure have been described for illustrative and not restrictive purposes, and alternative examples will become apparent to readers of this patent. Accordingly, the present disclosure is not limited to the examples described above or depicted in the drawings, and various examples and modifications may be made without departing from the spirit and scope of the claims below.

That which is claimed:
1. A trolley system comprising:
 a trolley comprising a housing, the housing comprising an internal compartment and a door configured to provide selective access to the internal compartment, wherein the door is movable between a closed position and an unclosed position; and a trolley node comprising a controller and a sealing module, the sealing module comprising:

a door sensor configured to detect a position of the door between the closed position and the unclosed position; and a locking mechanism activatable between a locked configuration and an unlocked configuration, wherein the controller is configured to selectively activate the locking mechanism to the locked configuration based at least on the door sensor detecting the door in the closed position.

2. The trolley system of claim 1, wherein the trolley node further comprises a visual indicator, and wherein the controller is configured to activate the visual indicator to emit a first visual transmission based on the locking mechanism being in the locked configuration.

3. The trolley system of claim 2, wherein the trolley node further comprises a temperature sensor configured to detect a temperature within the internal compartment, and wherein the controller is configured to activate the visual indicator to emit a second visual transmission based on the detected temperature being above a threshold temperature.

4. The trolley system of claim 2, wherein the trolley node further comprises a positioning module configured to detect a location of the trolley, and wherein the controller is configured to selectively activate the door locking mechanism to the locked configuration based at least on a change in location of the trolley detected by the positioning module from a first location to a second location.

5. The trolley of claim 4, wherein the positioning module comprises a Bluetooth beacon.

6. The trolley system of claim 1, wherein the trolley node is removable from the trolley.

7. The trolley system of claim 6, further comprising a node bracket secured to the housing of the trolley, wherein the trolley node is selectively positionable within the node bracket such that the trolley node is removable from the trolley.

8. The trolley system of claim 1, wherein the trolley node further comprises a communication module connected to the controller and comprising a wireless beacon, wherein the wireless beacon comprises an antenna.

9. A method of controlling a trolley system, the method comprising:

establishing, by a first trolley, a connection with a second trolley and receiving, by the first trolley, a trolley signal from the second trolley, wherein the trolley signal comprises a group identification of the second trolley;

determining, by the first trolley, a signal strength of the trolley signal and comparing the determined signal strength to a predetermined signal strength threshold; comparing, by the first trolley, the group identification of the second trolley to a group identification of the first trolley; and pairing, by the first trolley, the second trolley with the first trolley based on the determined signal strength being at least the predetermined signal strength and the group identification of the second trolley matching the group identification of the first trolley, wherein pairing the second trolley with the first trolley comprises activating a visual indicator of the first trolley and a visual indicator of the second trolley such that both visual indicators emit a first visual transmission.

10. The method of claim 9, further comprising activating the visual indicator of the first trolley to emit the first visual transmission and activating the visual indicator of the second trolley to emit a second visual transmission based on the determined signal strength being at least the predetermined signal strength and the group identification of the second trolley differing from the group identification of the first trolley, wherein the second visual transmission is different from the first visual transmission.

11. The method of claim 9, further comprising:

determining, by the first trolley, a number of additional trolleys paired with the first trolley;

comparing, by the first trolley, the number of paired additional trolleys to a predetermined swarm number;

activating the visual indicator of the first trolley to emit the first visual transmission based on the number of paired additional trolleys being less than the predetermined swarm number; and activating the visual indicator of the first trolley to emit a second visual transmission based on the number of paired additional trolleys being at least the predetermined swarm number.

12. The method of claim 9, further comprising:

determining, by the first trolley, a status of a door seal indicator of the second trolley based on the second trolley being paired with the first trolley;

activating the visual indicator of the second trolley to emit a second visual transmission based on an unsealed status of the door seal indicator; and transmitting, by the first trolley, an unsealed door notification to a handler device based on the unsealed status of the door seal indicator.

13. The method of claim 9, further comprising:

receiving, by the first trolley, a handler signal from a handler device, wherein the handler signal comprises a group identification and a process start identification;

comparing, by the first trolley, the group identification of the handler signal to the group identification of the first trolley; and activating the visual indicators of the first trolley and the second trolley to emit a second visual transmission based on the group identification of the handler signal matching the group identification of the first trolley.

14. The method of claim 13, further comprising:

determining, by the first trolley, a signal strength of the trolley handler and comparing the determined signal strength to the predetermined signal strength threshold, wherein activating the visual indicators of the first trolley and the second trolley is based on the determined handler signal strength being at least the predetermined signal strength.

15. A method of controlling a trolley system, the method comprising:

forming a swarm of trolleys, the swarm of trolleys comprising a group identification;

receiving, by a first trolley of the swarm of trolleys, a handler signal from a handler device, wherein the handler signal comprises a group identification and a process start identification;

comparing, by the first trolley, the group identification of the handler signal to the group identification of the swarm of trolleys; and activating a visual indicator on each trolley of the swarm of trolleys to emit a first visual transmission based on the group identification of the handler signal matching the group identification of the swarm of trolleys.

16. The method of claim 15, wherein the handler signal is a first handler signal, and wherein the method further comprises:
receiving, by the first trolley, a second handler signal from the handler device, the second handler signal comprising the group identification and a process end identification; and
locating, by the first trolley, each trolley of the swarm of trolleys, wherein locating comprises:
receiving by the first trolley a trolley signal from each of the trolleys of the swarm of trolleys;
comparing by the first trolley a signal strength of each trolley signal to a predetermined signal strength;
activating the visual indicator of each trolley of the swarm of trolleys to emit a second visual transmission based on the signal strength of the trolley signal from at least one trolley being less than the predetermined signal strength;
sending a location of the at least one trolley comprising the trolley signal less than the predetermined signal strength based on the signal strength of the trolley signal from the at least one trolley being less than the signal strength; and
activating the visual indicator on each trolley of the swarm of trolleys to emit a third visual transmission based on the signal strength of the trolley signal from each trolley being at least the predetermined signal strength.

17. The method of claim 15, further comprising:
determining, by the first trolley, a status of a door seal indicator of each trolley of the swarm of trolleys;
activating the visual indicator of at least one trolley to emit a second visual transmission based on an unsealed status of the door seal indicator of the at least one trolley; and
transmitting, by the first trolley, an unsealed door notification to the handler device based on the unsealed status of the door seal indicator of the at least one trolley.

18. The method of claim 15, wherein forming the swarm of trolleys comprises:
establishing, by the first trolley, a connection with a second trolley and receiving, by the first trolley, a trolley signal from the second trolley, wherein the trolley signal comprises a group identification of the second trolley;
determining, by the first trolley, a signal strength of the trolley signal and comparing the determined signal strength to a predetermined signal strength threshold; comparing, by the first trolley, the group identification of the second trolley to a group identification of the first trolley; and
pairing, by the first trolley, the second trolley with the first trolley based on the determined signal strength being at least the predetermined signal strength and the group identification of the second trolley matching the group identification of the first trolley,
wherein pairing the second trolley with the first trolley comprises defining the first trolley and the second trolley as the swarm of trolleys and activating the visual indicator of the first trolley and the visual indicator of the second trolley such that both visual indicators emit a second visual transmission.

19. The method of claim 15, further comprising:
determining, by the first trolley, a status of a door seal indicator of each trolley of the swarm of trolleys;
determining the location of the swarm of trolleys based on the handler device;
comparing the determined location to a predefined end location; and
activating the visual indicator of at least one trolley of the swarm of trolleys to emit a second visual transmission and transmitting a tamper alert to the handler device based on an unsealed status of the door seal indicator of the at least one trolley and the determined location not being the predefined end location.

20. The method of claim 15, wherein the handler signal comprises a process start time, and wherein the method further comprises:
determining, by the first trolley, a status of a door seal indicator of each trolley of the swarm of trolleys;
determining the process duration time from the process start time;
comparing the process duration time to a predefined process end time; and
activating the visual indicator of at least one trolley of the swarm of trolleys to emit a second visual transmission and transmitting a tamper alert to the handler device based on an unsealed status of the door seal indicator of the at least one trolley and the process duration time not being the predefined process end time.

* * * * *